United States Patent [19]

Hettinger, Jr. et al.

[11] 4,431,749

[45] Feb. 14, 1984

[54] LARGE PORE CATALYSTS FOR HEAVY HYDROCARBON CONVERSION

[75] Inventors: William P. Hettinger, Jr., Russell, Ky.; James E. Lewis, Dublin, Ohio

[73] Assignee: Ashland Oil, Inc., Ashland, Ky.

[21] Appl. No.: 318,186

[22] PCT Filed: Apr. 10, 1981

[86] PCT No.: PCT/US81/00492

§ 371 Date: May 5, 1981

§ 102(e) Date: May 5, 1981

[87] PCT Pub. No.: WO82/03571

PCT Pub. Date: Oct. 28, 1982

[51] Int. Cl.³ .................. B01J 29/06; B01J 37/08
[52] U.S. Cl. ............................ 502/68; 502/64; 502/65
[58] Field of Search ............... 252/445 Z; 208/120

[56] References Cited

U.S. PATENT DOCUMENTS

| | | | |
|---|---|---|---|
| 2,691,598 | 10/1954 | Meurice et al. | 252/449 X |
| 3,219,590 | 11/1965 | Ribaud | 252/455 Z |
| 3,525,775 | 8/1970 | Bolton et al. | 252/455 Z |
| 3,676,330 | 7/1972 | Plank et al. | 252/455 Z |
| 4,123,390 | 10/1978 | Sherman et al. | 252/455 Z |
| 4,231,899 | 11/1980 | Chen et al. | 252/455 Z |
| 4,377,502 | 3/1983 | Klotz | 252/455 |

FOREIGN PATENT DOCUMENTS 891826 1/1982 Belgium .

*Primary Examiner*—Carl F. Dees
*Attorney, Agent, or Firm*—Richard C. Willson, Jr.

[57] ABSTRACT

Disclosed is a catalyst, a method for its preparation, and a process for its use in the production of high octane gasoline and/or other valuable liquid hydrocarbon products from carbo-metallic oils contaminated with heavy metals and coke precursors. The catalyst is prepared from a shapable composition containing reticulated carbon black particles which are subsequently removed by burning, as in a catalyst regenerator, to provide large feeder pores in a shaped catalyst structure. The catalyst and process conditions for its use facilitate conversion of the contaminated oils to lighter products at catalytic sites within the catalyst structure which may contain zeolitic materials.

30 Claims, 18 Drawing Figures

1 DIVISION = 51nm  SCALE = 944287

| CONTOURS | | | | POINTS | |
|---|---|---|---|---|---|
| # | HEIGHT | AREA | PERIMETER | # | HEIGHT |
| 1 | 27.77 | 7680 | 521 | | |
| 2 | 9.80 | 744 | | | |
| 3 | 44.11 | 960 | | | |
| 4 | 13.07 | 833 | HOR DIST BETWEEN | | |
| 5 | 34.30 | 1748 | PT | 1 | |
| 6 | 60.44 | 1365 | AND | | |
| 7 | 66.98 | 457 | PT | 2 | |
| 8 | 55.54 | 951 | = | 27.56 | |
| 9 | 45.74 | 451 | | | |
| 10 | 13.07 | 329 | HOR DIST BETWEEN | | |
| 11 | 42.47 | 1517 | PT | 3 | |
| 12 | 50.64 | 392 | AND | | |
| 13 | 57.17 | 409 | PT | 4 | |
| 14 | 37.57 | 1490 | = | 173.81 | |
| 15 | 17.97 | 586 | PARTICLE SIZE | | |

PARTICLE SIZE
                27.56
LONGEST DIMENSION
                173.81
AGGRE. AREA
                7679.50
AGGRE. PERIMETER
                521.12
WIDTH           44.18
PROJECTED LENGTH
                260.56
BRANCHING FACTOR
                1.50
VOLUME    33704943
CIRCULARITY FACTOR
                2.81
SPHER. FACTOR   7.09
FORM FACTOR     3.93
                28
                174
                7680
                521
                337

| CONTOURS | | | POINTS | |
|---|---|---|---|---|
| # | HEIGHT | AREA | PERIMETER | # HEIGHT |
| 1 | 439.05 | 30829 | 1066 | |
| 2 | 1624.50 | 4117 | | |
| 3 | 965.92 | 5733 | | |
| 4 | 395.15 | 4157 | | |
| 5 | 131.72 | 7141 | HOR DIST BETWEEN | |
| 6 | -439.05 | 3184 | PT | 1 |
| 7 | 658.58 | 2668 | AND | |
| 8 | 1273.26 | 1731 | PT | 2 |
| 9 | 1053.73 | 2392 | = | 45.24 |
| 10 | 87.81 | 4978 | | |
| 11 | 965.92 | 1704 | HOR DIST BETWEEN | |
| 12 | 746.39 | 1779 | PT | 3 |
| 13 | 570.77 | 2493 | AND | |
| 14 | 175.62 | 3789 | PT | 4 |
| 15 | 526.86 | 1354 | = | 255.25 |
| 16 | 351.24 | 1659 | | |
| 17 | 131.72 | 3805 | HOR DIST BETWEEN | |

HOR DIST BETWEEN
PT      5
AND
PT      6
=       239.56
PARTICLE SIZE
        45.24
LONGEST DIMENSION
        255.25
AGGRE. AREA
        30829.26
AGGRE. PERIMETER
        1065.58
WIDTH    120.78
PROJECTED LENGTH
        532.79
BRANCHING FACTOR
        2.09
VOLUME  2383263.41
CIRCULARITY FACTOR
        2.93
SPHER. FACTOR  8.57
FORM FACTOR    2.11
        45
        255
        30829
        1066   1 DIVISION = 92 nm  SCALE = 525598
        2383

FIG. IIA
| CONTOURS | | | POINTS | |
|---|---|---|---|---|
| # | HEIGHT | AREA | PERIMETER | #HEIGHT |
| 1 | 47.07 | 8402 | 548 | |
| 2 | 71.42 | 2159 | | |
| 3 | 30.84 | 1207 | | |
| 4 | 32.46 | 456 | MAXIMUM SCALE | |
| 5 | 0.00 | 394 | | 878804 |
| 6 | 45.45 | 3579 | | |
| 7 | 61.68 | 658 | $\Delta X = \Delta Y =$ | 219 |
| 8 | 19.48 | 802 | | |
| 9 | 47.07 | 602 | ZMAX | 75 |
| 10 | 27.59 | 1091 | | |
| 11 | 11.36 | 776 | HOR DIST BETWEEN | |
PT 1
AND
PT 2
= 27.15
HOR DIST BETWEEN
PT 3
AND
PT 4
= 155.96
PARTICLE SIZE
27.15
LONGEST DIMENSION
155.96
AGGRE. AREA
8402.19
AGGRE. PERIMETER
547.89
WIDTH 53.88
PROJECTED LENGTH
273.94
BRANCHING FACTOR
1.76
VOLUME 318340.46
CIRCULARITY FACTOR
2.84
SPHER. FACTOR 8.72
FORM FACTOR 2.89
27
156
8402
548
318
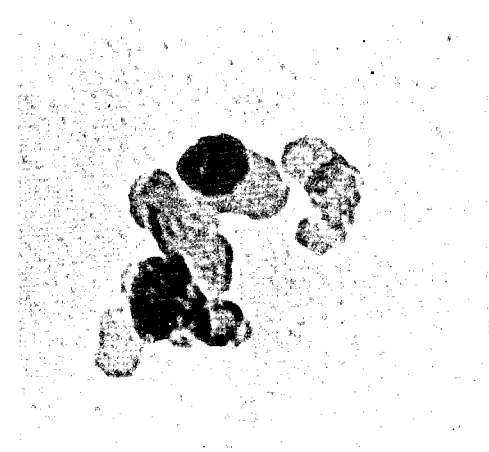
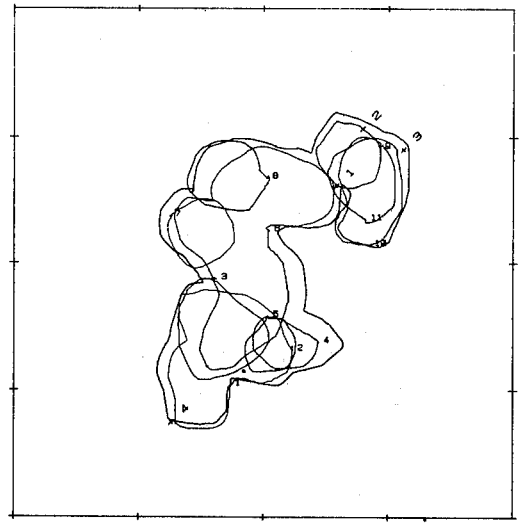
FIG. IIB
IDIVISION= 55nm SCALE= 878804

| CONTOURS | | POINTS | |
|---|---|---|---|
| # HEIGHT | AREA | PERIMETER | # HEIGHT |
| 1  19.59 | 10529 | 559 | |
| 2   2.18 |   907 | | |
| 3  15.24 |  1100 | | |
| 4  32.65 |   772 | MAXIMUM SCALE | |
| 5  45.71 |   362 | | 832509 |
| 6  52.24 |  1490 | | |
| 7  13.06 |  3641 | $\triangle X = \triangle Y =$ | 231 |
| 8  50.06 |  1370 | | |
| 9  19.59 |  1228 | Z MAX | 54 |
| 10 47.88 |  2448 | | |
| 11 34.82 |  1908 | HOR DIST BETWEEN | |
| 12 34.82 |  1378 | PT | 1 |
| 13 32.65 |  1345 | AND | |
| | | PT | 2 |
| | | = | 29.37 |

HOR DIST BETWEEN
PT                3
AND
PT                4
=              169.81
PARTICLE SIZE
                29.37
LONGEST DIMENSION
               169.81
AGGRE. AREA
             10528.96
AGGRE. PERIMETER
               559.06
WIDTH        62.00
PROJECTED LENGTH
               279.53
BRANCHING FACTOR
                 1.65
VOLUME    527144.16
CIRCULARITY FACTOR
                 2.36
SPHER. FACTOR   5.60
FORM FACTOR     2.74
                  29
                 170
               10529
                 559
                 527

1 DIVISION = 58 nm   SCALE = 832509

MAT CONVERSION VS. RELATIVE ACTIVITY
REFERENCE CATALYST CONVERSION: 75%
DAVISON FEEDSTOCK

LARGE PORE CATALYSTS FOR HEAVY HYDROCARBON CONVERSION

TECHNICAL FIELD

This invention relates to an improved catalyst, a method for its preparation, and a process for its use in the conversion of petroleum oil feeds containing hydrocarbon molecules of high molecular weight (heavy). More particularly, the invention is related to a catalyst composition comprising a catalytically active crystalline aluminosilicate zeolite uniformly dispersed within a matrix component having large feeder pores for conveying reactants to and reaction products from the zeolitic component.

BACKGROUND OF THE INVENTION

In general, gasoline and other liquid hydrocarbon fuels boil in the range of about 100° F. to 650° F. However, the crude oils from which these fuels are made contain mixtures of hydrocarbons which boil over wider temperature ranges, the boiling point of each hydrocarbon depending upon its molecular weight. As an alternative to discarding or otherwise using the higher boiling hydrocarbons, the petroleum refining industry has developed a variety of processes for breaking or cracking the large molecules of high molecular weight into smaller molecules which boil within the above boiling range for hydrocarbon fuels. The cracking process which is most widely used for this purpose at the present time is known as fluid catalytic cracking (FCC) and may employ a fluidized bed reactor with backmixing and/or a riser reactor with progressive flow. In a typical FCC process, feedstock oil is mixed with particulate catalyst at an elevated temperature in the lower portion of an elongated reaction vessel called a "riser". Contact of the hot catalyst with the oil rapidly generates large volumes of gases which propel the stream of feed and catalyst as a suspension through the reaction zone at high velocity, giving relatively short contact times.

The initial propelling gases are comprised of vaporized oil, the major portion of which boils below 1,025° F. and is immediately vaporized by contact with the hot catalyst which enters the riser at a higher temperature. As the suspension travels up the riser, a large fraction of the feedstock hydrocarbons is converted to lower boiling hydrocarbons by catalytic cracking and these cracked products form part of the propelling gases. The velocity of the suspension is sometimes increased further by introducing diluent materials into the riser either along with the feed or separately. The conversion reaction initiated in the lower portion of the riser continues until the catalyst and gases are separated, which may take place as the suspension leaves the riser reaction zone or in an upper, larger diameter vessel for collecting the catalyst. Upon being separated from the catalyst, the gases are usually referred to as "product vapors".

Crude oil in its natural state contains a variety of materials which, unless removed prior to the cracking reaction, tend to have troublesome effects on FCC processes. These include coke precursors, such as asphaltenes, polynuclear aromatics and high boiling nitrogen containing molecules; and metals, such as sodium and small amounts of other alkali or alkaline earth metals, nickel, vanadium, iron and copper, which are detrimental to the conversion process and/or to the catalyst.

During the cracking operation, coke precursors either tend to deposit as solid aromatic structures having some residual hydrogen or are high boiling and do not vaporize but lay down on the catalyst as a liquid. These coke deposits block the catalytically active acid sites of the catalyst and thereby reduce its conversion activity. While it is believed that both the solid and liquid components of coke may cover and thereby block acidic sites, the liquid components may also fill pores of the matrix and thereby retard diffusion of lower boiling components to the zeolite. Although the carbonaceous material formed by the conversion process is referred to as coke, it may have hydrogen to carbon ratios of 1.0 or greater and may contain in addition to hydrogen various amounts of other element depending upon the composition of the feed. The coke formed is deposited on the catalyst particles and thereby reduces the conversion activity of the catalyst. In order to restore conversion activity, the contaminated catalyst is regenerated by burning off the coke by contacting the catalyst particles at relatively high temperatures with an oxidizing gas such as air. The regenerated catalyst may then be returned to the reaction zone for additional passes or conversion cycles in contact with fresh feed.

In general, the coke-forming tendency or coke precursor content of a feedstock oil can be ascertained by determining the weight percent of residue remaining upon pyrolyzing a sample of the feed. Two tests presently recognized by the industry are the Conradson carbon residue test described in ASTM D189-76 and the Ramsbottom carbon test described in ASTM D524-76. In conventional FCC practice, Conradson carbon residues of about 0.05 to 1.0 are regarded as indicative of relatively contaminate free gas oil feeds.

Unless removed by careful desalting of the crude oil, the sodium, and other alkali or alkaline earth metals can diffuse to the active, i.e., acidic, sites of the catalyst and poison or kill their catalytic activity. Vanadium, and to a lesser extent nickel and other metals, may also migrate to and poison acidic sites. There metals will therefore be referred to collectively as poison metals. Nickel, vanadium, copper and iron are also known as "heavy metals" and catalyze undesirable dehydrogenation reactions which increase the amount of coke deposited on the catalyst and the amounts of hydrogen and normally gaseous hydrocarbons to be handled by process equipment. During the cracking process, the heavy metals transfer almost quantitively from the feedstock oil to the catalyst particles and tend to deposit on interior and exterior surfaces of the particles where they can block and/or retard diffusion to active sites.

Since the various heavy metals are not of equal poisoning activity relative to catalytic acid sites, it is convenient to express the poisoning activity of an oil containing one or more of these metals in terms of the amount of a single metal which is estimated to have equivalent poisoning activity. Thus, the heavy metals content may be expressed by the following formula in which the content of each metal present is expressed in parts per million by weight based on the weight of the oil: Nickel Equivalents $= Ni + V/4.8 + Fe/7.1 + Cu/1.23$. In conventional FCC practice, crude oils are carefully fractionated to provide a gas oil with a relatively low level of heavy metal contaminants, namely, 0.25 ppm Nickel Equivalents or less.

The above formula can also be used as a measure of the heavy metals accumulated on the cracking catalyst itself, the quantity of metal used in the formula being based on the weight of moisture-free catalyst. In FCC practice, equilibrium catalyst is removed and fresh, contaminant-free catalyst is added at a rate sufficiently high to control the heavy metal content of the catalyst at relatively low levels, namely, 1,000 ppm Nickel Equivalents or less.

Some crude oils contain from about 10% to about 30% by volume of heavy hydrocarbons which will not boil below about 1,025° F. at atmospheric pressure. Atmospheric bottoms and vacuum bottoms may contain even higher percentages of this highest boiling fraction. The coke precursor and poison metal components of the crude are for the most part concentrated in this fraction. Accordingly, many of the problems presented by these components have been avoided by sacrificing the yield of liquid fuel fractions which is potentially available from cracking the highest boiling fraction. More particularly, in conventional FCC practice, the crude oil has been vacuum fractionated to provide a FCC feedstock boiling between about 650° F. and about 1,000° F., this fraction being referred to as a vacuum gas oil and being relatively free of coke precursors and poison metals. Vacuum gas oil is generally prepared from crude by distilling off the fraction boiling below about 650° F. at atmospheric pressure and then separating by vacuum distillation one or more fractions boiling between about 650° F. and about 1,025° F. from the heaviest fraction boiling above 1,025° F. The heaviest fraction is normally not used as a source of catalytic conversion feedstock, but instead is employed for other purposes, such as the production of asphalt, which represents a waste of the potential value of this portion of the crude oil as a source of liquid fuels.

Due to the continually increasing demand for gasolines, relative to heavier liquid fuels, coupled with shrinking supplies of normally used gas oil cracking stocks, more attention has recently been given to the catalytic cracking of heavier chargestocks, such as residuals from which the highest boiling fraction has not been separated. In addition, consideration has been given to blending the heaviest or "resid" fraction with various lower boiling fractions in order to increase overall conversion of crude oil to liquid fuels. In view of the high potential value of the heaviest fraction of crude oils, a number of methods have been proposed in the past to overcome the problems associated with the cracking of feedstocks contaminated with metals and coke precursors and thereby increase the overall yield of gasoline and other hydrocarbon fuels from a given quantity of crude oil. Suggestions have been made to pretreat the contaminated feed to reduce the metals content to below about 4 ppm nickel equivalents and the Conradson carbon residue to below about 1. Various demetalization techniques have also been suggested for removing the metal contaminants once they have been deposited on the catalyst. Most of these prior art techniques, however, require expensive additional equipment and materials and cannot be justified from an economic standpoint.

Attention has also been given to developing improved catalysts for cracking more contaminated feeds. However, many problems have been encountered in the use of prior art catalysts for cracking feeds containing a resid fraction.

A catalyst comprised of crystalline zeolite particles embedded within a larger matrix particle has numerous passages leading from the outer peripheral surface of the matrix particle to the smaller zeolite particles supported within the matrix. In this specification, these matrix passages are referred to as "feeder pores". Feeder pores in effect provide access passageways from the surface of each catalyst particle to those zeolite particles at locations internal to the matrix. There also may be a small but finite number of zeolite particles exposed at the surface of the matrix.

Generally, the pores of zeolitic sieves fall within the range of 4 to 13A°. Accordingly, any pores larger than 13A° are usually in the matrix. In prior art catalysts of this type, the average diameter of feeder pores in fresh catalyst usually falls within the range of about 30A° to about 400A°. Alumina-silica matrices generally have pores in this range, although a relatively small proportion may be larger. However, after an extended period of use, the effective average pore diameter of these prior art catalysts may be decreased significantly because of coke and metal accumulations. These prior art catalysts have proven inefficient for cracking resid containing feedstocks for a number of reasons, including both a low zeolite utilization factor and undesirable reaction diffusion limitations. The low zeolite utilization effect is a consequence primarily of the deposition of both coke and heavy metals in and/or across the mouths of the working pores of the zeolite. These components in effect block off zeolitic pore volume containing unused or incompletely used acidic sites.

"Zeolitic pore volume" refers to the free volume of the micropores in the zeolite component rather than the matrix. The term "pore volume" as applied to the catalyst composition as a whole refers to the free volume in the matrix and zeolite combined which is provided by both macropores (pores having a minimum diameter above 30A°) and micropores (pores having a minimum diameter of 30A° ore less). The pore volume fraction for pores greater than 30A° in diameter may be determined by mercury porosimetry methods, such as the method of U.S. Pat. No. 3,853,789.

The pore volume fraction in the 0 to 30A° may be determined by the BET nitrogen adsorption method described by Brunauer, Emmett, and Teller in the Journal of the American Chemical Society, 60, 309 (1938). The pore volume of fresh hydrocarbon conversion catalyst may vary widely depending upon the size of the pores in the matrix and, where used, the relative amount of catalytic promoter, such as zeolite, and the size of its pores.

Diffusion limitations may result from a number of different mechanisms. One such limitation is a consequence of high molecular weight molecules in the feed and the absence of a sufficient number of feeder pores of the size range required for transporting these large molecules to the acidic sites of the catalyst, some of which may be in the matrix but the majority of which are in the zeolite. Another diffusion limitation in the processing of reduced crude or other resid containing feeds is due to what may be called "pore plugging". Pore plugging is caused by the absorption of unvaporized hydrocarbons in the catalyst pores so that they are impractical to remove by stripping operations prior to regeneration. The trapping of heavy hydrocarbons which cannot be removed by conventional stripping operations can lead to excessive coke and regeneration temperatures and increased air consumption. Pore plugging and the deposition of coke and/or heavy metals within or over the pores also leads to decreased diffusion of reactants to and products from acidic sites. Slow diffusion rates may result in thermal cracking predominating over catalytic cracking, which in turn causes loss of selectivity. Thus, catalysts possessing relatively small or restricted feeder pores will show relatively poor cracking characteristics when cracking resid containing feeds, including low conversion, poor selectivity, increased air consumption during regeneration, and higher regeneration temperatures. Hot spots also occur more readily during regeneration and cause catalyst deactivation through sintering of the matrix and loss of zeolite crystalline structure and acidity. Furthermore, low catalyst utilization factors and diffusion limitations both require high catalyst to oil ratios which necessitate relatively low oil feed rates.

In order to provide economic levels of conversion activity and more importantly the selectivity required in processing the very refractory hydrocarbons found in resid fractions, it is desirable to run the riser at a relatively high temperature. In addition, large amounts of coke accumulate on the catalyst. The primary problem with this increased coke make is that the reactions in the regenerator which convert coke to carbon monoxide and carbon dioxide are highly exothermic. Since the regeneration reactions are exothermic, the regeneration step is normally carried out at a temperature much above the cracking temperature in the riser. This makes it necessary to run the regenerator at maximum temperatures in order to burn the coke off the catalyst to the relatively low levels required for restoration of its activity. To achieve a heat balance in cracking resid, it is therefore necessary to operate the regenerator at very severe hydrothermal conditions, which can cause rapid degradation of many prior art catalysts.

At high regenerator temperatures, excess heat and localized hot spots may develop within catalyst particles, especially in places where pore plugging has occurred or excessive coke deposits have accumulated. These localized hot spots result in sintering and collapse of the matrix pore structure, thus rendering a large portion of the acidic sites in the matrix unavailable for further reactant contact. Where a catalytic promoter is used, the promoter will necessarily be entrapped within the collapsed pores of the matrix and blocked off from further reactive contact. Coke from resid molecules can also cover and block portal surface areas of both the matrix and the zeolite.

The crystalline structure of zeolites is susceptible to degradation by high regenerator temperatures per se. Zeolites are crystalline alumino-silicates made up of tetra-coordinated aluminum atoms associated through oxygen atoms with silicon atoms in an ordered crystalline structure. Localized hot spots in or near the zeolite particles can cause destruction of the aluminosilicate crystalline structure, at least to the extent of destroying portal area of the zeolite, with a resulting loss of its catalytic action. Furthermore, both sodium and vanadium contaminates accelerate sintering and collapse of pore structures in both the matrix and zeolite components. Such degradation permanently deactivates the catalyst so that it must be removed from the system, resulting in high make-up rates that may prove uneconomical because of the high cost of zeolite in the catalyst. There is a need therefore for a heat resistant zeolite catalyst suitable for use in cracking resid containing oil feeds with improved overall utilization of acidic sites and a minium of diffusion limitations.

While it has been recognized in the past that the physical structure of catalyst particles plays an important role in their effectiveness, the extent to which such structure is important generally has been obscured by the lack of analytical techniques for isolating the complex mechanisms involved in catalytic cracking. In this connection, some attention has been given in the prior art to increasing the pore size of catalyst matrices. Thus, it has been suggested that extremely large pores, such as those with diameters above 1,000A°, might be introduced into a catalyst by incorporating a removable material and subsequently removing that material during catalyst preparation. See, for example, the catalysts described in U.S. Pat. No. 2,890,162 to Anderson, et al., and U.S. Pat. No. 3,944,482 to Mitchell, et al. However, the removable materials suggested for this purpose have not been easily controllable and have resulted in poorly defined pore structures and a wide variety of pore sizes, relatively few, if any, of the pore diameters being in the actual size range needed for resid cracking.

DISCLOSURE OF THE INVENTION

The present invention provides a catalyst and a process for selective conversion of heavy hydrocarbons. It is therefore a principal object of the invention to provide a special hydrocarbon conversion catalyst resistant to deactivation by severe hydro-thermal conditions and by accumulations of coke precursors and poison metals. Another object of the invention is to provide an improved process for catalytic conversion of high boiling carbo-metallic oil feeds containing relatively high concentrations of coke precursors and poison metals. The catalyst and process of the invention are particularly useful for cracking oil feeds which contain significant quantities of residual hydrocarbons, e.g., at least ten percent, boiling above about 1,025° F., and significant quantities of heavy metals, e.g., at least about 4 ppm of Nickel Equivalents. Feeder pores having large minimum diameters and large mouths are provided in the catalyst of the invention so as to facilitate diffusion of high molecular weight molecules through the matrix to the portal surface area of the sieve particles. The catalyst matrix also has a relatively large pore volume in order to soak up unvaporized portions of the oil feed. The feeder pores through the matrix are sufficiently large so that significant numbers of hydrocarbon molecules can diffuse to active catalytic sites both in the matrix and n the sieve. On the other hand, the open channels of these feeder pores are somewhat tortuous and tend to trap molecules having molecular weights of or greater and average diameters of 200A° or greater (for example asphaltenes, porphyrins and polynuclear aromatics). These very large molecules can effectively cover and block the relatively small pores of the zeolitic sieve. The size and structure of the feeder pores of the invention are such that they remain open without diffusion restrictions even when matrix surfaces and pore channel walls become loaded with very large asphaltene type molecules.

It has been discovered that the optimum average diameter for feeder pores in the catalyst matrix is in the range of 400 to 6,000A°, preferably 1,000 to 6,000A°. It has also been discovered that these pore size ranges can be easily and readily obtained with the use of carbon black particles having a crosssectional diameter in the range of about 100 to 1,000A° and a length to diameter ratio greater than about 2:1, preferably greater than about 5:1. Upon firing a catalyst composition containing these carbon black particles, such as during the regeneration cycle of a cracking process, the carbon burns out of the matrix, leaving large feeder pores within the desired size range. The carbon black may be added at almost any time during the catalyst preparation prior to drying the final catalyst composite. The fired catalyst has a relatively large and controlled number of feeder pores within the desired size range, the number and size distribution of these pores being enhanced a significant extent by the type and amount of dispersant used for suspending the carbon black in the aqueous suspension from which the unfired composite is made.

The large feeder pores of the invention extend from the surface to the interior of the matrix particles and provide access channels the much smaller zeolite particles supported within the matrix material. Carbon black may be incorporated in the catalyst matrix by adding it to a composite catalyst slurry along with the zeolitic component prior to spray drying the slurry to form final microspheres of matrix supported zeolite. Where a kaolin clay composition is spray dried, calcined and then treated to generate zeolite crystals in situ, the carbon black may be added to the clay slurry fed to the spray drier so as to be present in the composition during and after in situ formation of the zeolite within the matrix material.

A competing consideration for the selectivity desired in cracking residual feeds is that there must be sufficient acid sites present so that catalytic cracking dominates the conversion reaction. Thus, as average pore size and pore volume increase, catalytic surface area may decrease. To compensate for this decrease in surface area, the amount of zeolitic promoter can be increased and/or smaller zeolite particles (crystals) employed to increase the portal surface area of this component. A preferred catalyst of the invention therefore contains relatively high concentrations of very small zeolitic sieve particles supported within an alumina, silica and/or alumina-silica matrix. Both the sieve and the matrix should have good steam and thermal stability. A "Y" type zeolite sieve relatively free of sodium and stabilized with hydrogen and/or ammonium ions and/or rare earth ions is preferred. According to a preferred embodiment of the invention, spray dried microspheres containing carbon black are partially exchanged with rare earths, calcined to remove the carbon black and stabilize the zeolite, and further exchanged with rare earths to provide a catalyst having superior hydrothermal stability.

Acidic sites may also be provided in the matrix material so that at least some of the heavier hydrocarbons, both liquid and vaporous, can be cracked on the surfaces and in the passages of the matrix to provide a means by which molecules larger than the sieve pores can be converted to smaller molecules of a size small enough to enter and be cracked in the sieve. For example, alkyl fragments can be stripped from large aromatic molecules so that the fragments may enter the highly active pores of the zeolite.

The large feeder pores and process conditions of the present invention provide increased conversion and improved selectivity in the cracking of reduced crude and other resid containing oil feeds. In this connection, it is believed that these larger pores are capable of maintaining adequate diffusion of reactants and reaction products while providing sufficient pore volume and surface area in the matrix for absorption and retention of poison metals, coke and unvaporizable hydrocarbons. Although not wishing to be bound by any particular theory or hypothesis as to the reasons for the improvements afforded by the invention, the following matters may contribute to its success.

According to the literature, a normal $C_{45}$ hydrocarbon molecule has a boiling point above 1500° F., a cross-sectional diameter of about 4A° and a maximum length of about 50A°. Therefore, with a conventional catalyst matrix having an effective pore diameter at equilibrium of less than 50A°, this heavy molecule can enter the average pore based on its minimum cross-sectional demension but cannot enter based on its length dimension. Thus some net orientation would be required for heavy molecules of a resid fraction to traverse the pores of the matrix and reach the acid sites of the zeolite. Statistically, heavy molecules, such as those having molecular weights in the range of 1,000 to 10,000, would exist in a relatively disordered state so that some of the molecules would not be able to enter the matrix of catalysts having relatively small feeder pores. Since the reactants and the products of catalytic conversion must necessarily use the same feeder pore passages and diffuse in opposite directions, the rate of diffusion into a pore must equal the rate of diffusion out under steady state conditions. It is therefore believed that the large feeder pores of the invention decrease the necessity for a particular molecular orientation and therefore increase diffusion rates through these pores, particularly at equilibrium conditions where effective pore diameters necessarily reflect deposits of coke and heavy metals on the wall of pore channels.

The larger feeder pores of the matrix allow coke and metal deposition near the surface of the catalyst particles without pore blockage and absorption of heavy liquid hydrocarbons without pore plugging. Large vaporized hydrocarbon molecules can enter and exit these pores at equilibrium conditions without special orientation and can therefore more easily reach acidic sites which are concentrated in the zeolite but also may be present to a lesser extent in the matrix material. In a sense, the large pores are able to "soak up" both metal poisons and liquid coke precursors and in effect neutralize at least a portion of these contaminants. The high pore volume provides physical space in which to "load" these types of contaminants without unduly restricting diffusion, even in the presence of partial sintering. The large pores also facilitate reactions between the trapped material and elements or compounds that may be added to the riser or regenerator in order to passivate the poison metals accumulated on the matrix.

Unusually high temperatures are needed to crack resid containing feedstock for the reasons given previously. However, at the high temperatures proposed, thermal cracking reactions compete with catalytic cracking reactions. The product distribution (selectivity) for the thermal reaction is quite different from the catalytic reaction and highly undesirable, the thermal reaction yielding much lighter gases, more coke, high boiling gas oils with high Conradson carbon values, and relatively low octane gasoline range products. The activation energy for catalytic cracking is considerably lower than for thermal cracking. With prior art catalysts, as the coke and metals deposit on the catalyst and the liquid asphaltene components fill the relatively small matrix pores, diffusion of the hydrocarbon reactants to the acidic sites of the zeolite is retarded to the extent that diffusion through the matrix becomes rate limiting. As this occurs, the apparent activation energy for catalytic cracking rises and diffusion becomes rate limiting, as this occurs, the activation energy for thermal cracking, which remains constant, results in greater proportions of the undesirable thermal produce distribution. Because the hydrocarbon molecules of a residual feed have relatively easy access to the zeolite in the catalyst disclosed, the catalytic reaction is much faster than the thermal reaction, giving higher conversion and the desired catalytic product distribution.

In addition, improved diffusion rates for regeneration gases and combustion products within the particles help avoid hot spots during catalyst regeneration and thereby reduce sintering of both the matrix and the promoter materials. Coke also tends to deposit nearer to the particle surface where it can be more easily reached by regeneration gases and burned off at lower temperatures.

While the pore volume is large, the surface area of the matrix may be correspondingly low. This relatively low surface area, together with large feeder pores, minimizes the physical and/or chemical retention of vaporizable hydrocarbon molecules so as to facilitate stripping these molecules from the catalyst and reducing the amount of coke carried into the regenerator. The amount of carbon burning is less and the amount of air necessary for regeneration is thereby reduced.

Although the carbon black (CB) catalysts disclosed may be used in a variety of conversion processes employing a wide variety of contacting equipment, it is particularly useful in the catalytic cracking apparatus and process of the invention. The apparatus disclosed comprises a progressive flow riser with a ballistic separator at the upper end of the riser for causing a sudden and substantially instantaneous separation of catalyst particles from product vapors. The catalyst is then transferred to a stripping vessel for removal of residual hydrocarbons removable in the presence of high temperature steam and/or other stripping gases. Stripped catalyst is then transferred to a two-stage combuster having insufficient oxygen in the first stage to convert all of the carbon to carbon dioxide and an excess of oxygen in the second stage to almost completely burn off the carbon remaining after the first stage. The regenerated catalyst particles attain relatively high temperatures in the range of about 1,300° F. to 1,500° F. and have very low levels of residual carbon, namely, 0.05 weight percent or less. The regenerated catalyst particles are then returned to the bottom of the riser where they are contacted with fresh feedstock.

The conversion process of the invention is particularly effective in utilizing the CB catalysts for cracking resid containing, carbo-metallic feeds of the type described. Fresh oil feed and a diluent, such as steam, are mixed with the hot regenerated cracking catalyst at or near the bottom of the riser, vaporizing and/or fluidizing the feed and diluent substantially instantaneously to form a vaporous suspension that flows rapidly upward to the ballistic separator. The temperature and catalyst oil ratio in the suspension is sufficiently severe to convert approximately 50 to 90% of the carbo-metallic oil feed to gasoline per pass and produce relatively high levels of coke on the catalyst. The velocity of the suspension combined with ballistic separation is such as to provide very short contact times and avoid overcracking the desired molecular species of the product, notwithstanding the high temperatures and very active catalyst. The regenerator also is operated at relatively high temperatures which provides rapid and effective coke removal and the heat necessary for the endothermic riser reaction. In view of the high temperatures, the regenerator configuration is such that the average catalyst hold up time for regeneration is relatively short, namely, on the order of about 3 to 5 minutes or less. Since relatively small amounts of catalyst are held up in other portions of the system, the overall catalyst inventory is significantly low.

Relatively high oxygen partial pressures are maintained in the regenerator, either in the last stage of multistage regenerators or in a zone immediately upstream of discharge conduits from single stage regenerators to keep heavy metals on the catalyst in their less active oxide form. The substantially instantaneous fluidization of the oil feed and the very short residence times employed tend to inhibit reduction of these metals in the riser to their more catalytically active free metal state. It is also contemplated that certain elements, such as antimony, may be added to the regenerator or riser to more permanently tie up accumulated heavy metals. The large pores and smaller surface areas of the CB catalysts facilitate such metals deactivation reactions. Although economically prohibitive at the present time, demetalization techniques also should prove to be more effective with CB catalysts.

Because the catalyst is resistant to degradation and process apparatus and parameters are adapted for its effective utilization, the make-up rates at which fresh catalyst must be introduced into the system are well within acceptable limits, namely, in the range of about 0.1 to 3.0 pounds of catalyst per barrel of fresh feed. More particular process parameters of the invention, together with further particulars on the catalyst and apparatus thereof, are given in the description below of the best mode for carrying out the invention.

BRIEF DESCRIPTION OF THE DRAWINGS

The invention may be further understood by reference to the description of the best mode taken in conjunction with the accompanying drawings in which:

FIGS. 9A, 10A, 11A, and 12A are micrographs made by a scanning electron microscope (SEM) showing reticulated carbon black particles of the type employed in the catalytic composition of the invention.

FIGS. 9B, 10B, 11B and 12B are contour plots and other data from photo-grammetric topography and correspond to FIGS. 9A through 12A, respectively.

BEST MODE FOR CARRYING OUT THE INVENTION

The Feedstock

Figure 1:
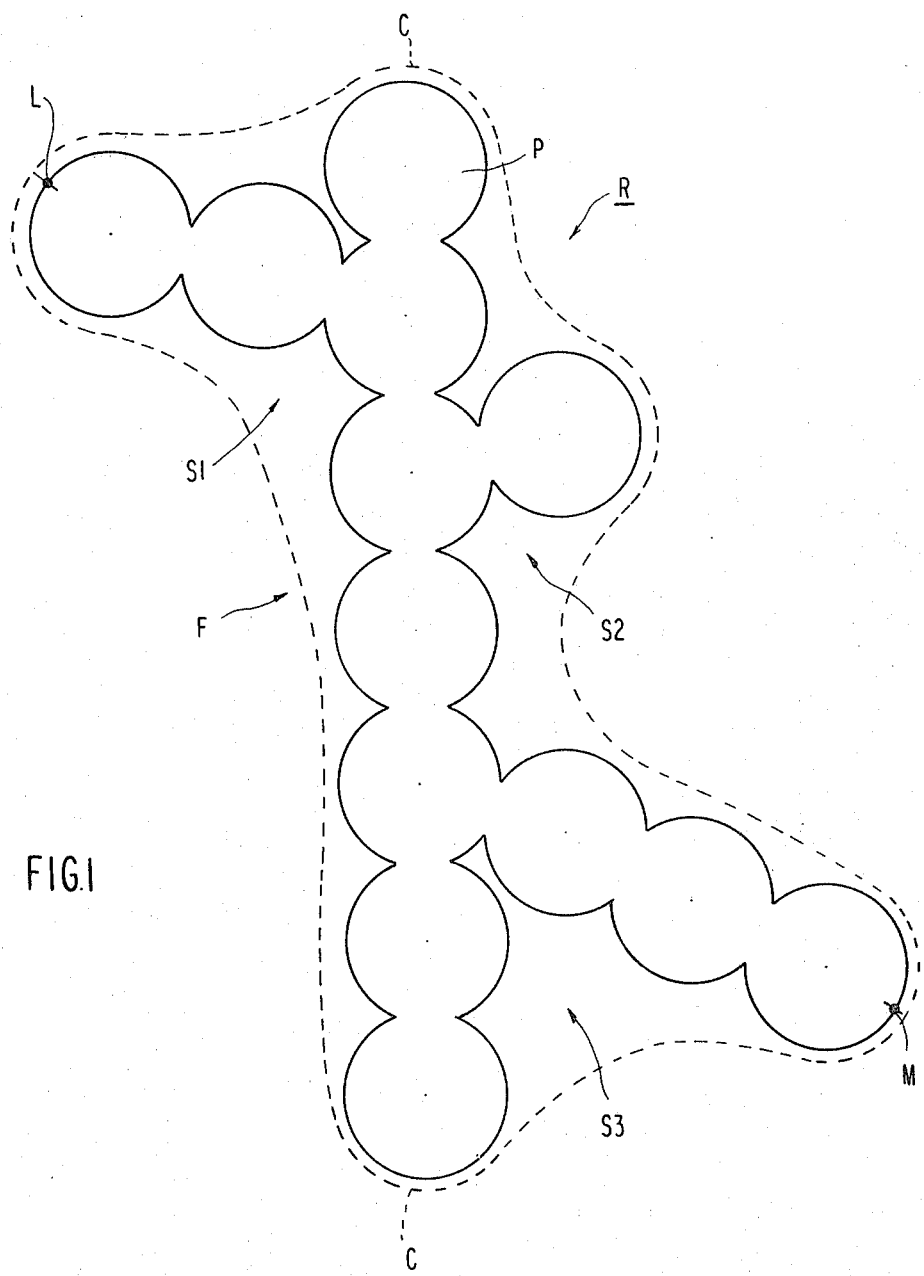
FIG. 1 is a diagramatic illustration of the reticulated structure of one type of carbon black employed in the catalyst composition of the invention.

The catalyst of the invention may be used for treating any hydrocarbon feedstock suitable for cracking to lower boiling components or for reforming or other hydrocarbon conversion processes. It is especially useful for cracking oil feeds containing an appreciable amount of high molecular weight components, for example a feedstock with at least 5 weight percent, preferably at least 10 weight percent, not boiling below 1,025° F. Diffusion limitation problems, in general, become increasingly troublesome with increasing fractions of high molecular weight components in the feedstock. Other factors involved include molecular configuration and the like. The terms "high molecular weight" and/or "heavy" components refer to those hydrocarbon fractions having a normal boiling point of at least 1,025° F. and include non-boiling hydrocarbons, i.e., materials which may not boil under any conditions.

These heavy components have relatively large molecular dimensions, the largest average dimension of each component being referred to here as its "average diameter". For purposes of selecting a catalyst having an optimum most frequent feeder pore size and distribution, some knowledge of the range of average diameters of the feedstock is desirable. One method of evaluating molecular sizes of large organic molecules is that of J. J. Hermans, et al. (J. Chem. Phys., Vol. 20, page 1360, 1952), in which the average effective molecular diameter in Angstroms (Å) is equal to $7.4 N^{\frac{1}{2}}$ where N is the number of carbon atoms in the molecule. Since various molecules have a variety of configurations and shapes, this procedure gives a relative indication of molecular sizes and provides a useful tool for estimating average molecular sizes and spreads of sizes in feedstocks. Such data may be used for selecting the predominant feeder pore sizes and size distribution characteristics of the catalyst to be prepared for given types of feedstocks. This method therefore may be used as the basis for calculating average molecular diameters and ranges of diameters for heavy feeds. Generally, high boiling hydrocarbon feedstock has a relatively wide range of molecular diameters for the molecules present with significant frequency. For example, the average difference between the lower and higher significant diameters may be as high as 250 Å. It is preferred that the ratio of average feeder pore size of the catalyst to average molecular diameter of the 1025° F. portion of the feedstock be at least about 2, preferably at least about 5.

The composite catalysts disclosed have a high tolerance both to metals and to coke precursors and these catalysts will economically crack feedstocks containgin high concentrations of such contaminants. A high metals feedstock for purposes of this invention is one having a heavy metal content of at least about 4 ppm of Nickel Equivalents. A high coking feedstock for purposes of this invention is one having a Conradson carbon residue value greater than about 1. The feedstocks for which the invention is particularly useful will have a heavy metal content of at least about 5 ppm Nickel Equivalents and a Conradson carbon residue of at least about 2. The greater the heavy metal content and the Conradson carbon residue, the more advantageous the catalyst and process of this invention becomes. A particularly preferred feedstock for treatment by the process of the invention includes a reduced crude and comprises 70 percent or more of a 650° F.+ material having a fraction greater than 20 percent boiling above 1025° F. at atmospheric pressure, a metals content of greater than 5.5 ppm Nickel Equivalents and a Conradson carbon residue of greater than 4. This feed may have a hydrogen to carbon ratio of less than about 1.8 and coke precursors in an amount sufficient to yield about 4 to 14 percent coke by weight based on fresh feed. If the metals and/or Conradson carbon are higher than these values, the feed may be pretreated (but preferably is not) by a hydrotreating step to saturate unsaturated hydrocarbons and/or by contacting adsorbent particles to remove a portion of the poison metals and carbon precursors.

Representative feedstocks contemplated for use with the invention include whole crude oils, fractions of crude oils such as topped crude, reduced crude, vacuum fractionator bottoms and other fractions containing heavy residua, coal-derived oils, shale oils, waxes, untreated or deasphalted residua, and blends of such fractions with gas oils and the like.

In addition to feedstock per se, added diluent materials may also be charged to the riser to lower the vapor pressure of the oil feed. Diluents will increase the space velocity of the process by accelerating the velocity of the oil and decreasing catalyst contact time. Any diluent which is a vapor or becomes a vapor under the conditions in the conversion zone can be used. If the diluent is a hydrocarbon, it should desirably have a boiling point below about 650° F., and more preferably it should be a gasoline range hydrocarbon, e.g., naphtha, or lighter, which fractions boil at about 430° F. or below. If added hydrocarbon boils above 650° F., it will itself be considered a portion of the cracking feedstock. Other diluents include various gases such as hydrogen, nitrogen, methane and ethane, and water, which may be charged either as liquid or steam. Such diluents may be added at or near the bottom of or at one or more locations along the riser conversion zone so as to assist in dispersal and fluidization of the catalyst, dispersal and vaporization of the liquid feedstock, quenching of the catalyst and/or oil suspension, and under some conditions, may increase the cracking rate and/or improve the selectivity of the cracking process.

With respect to the tolerance levels of the catalyst itself, the heavy metals may accumulate on the catalyst to levels in the range of from about 3,000 to about 20,000 ppm of Nickel Equivalents. Where about 4 to 14 percent of the feedstock is converted to coke, this coke is generally deposited on the catalyst in amounts in the range of about 0.3 to 3.0 percent by weight of the catalyst.

The Catalyst

The present invention includes a method of making a catalyst with a relatively large percentage of pores in size ranges above Å, preferably in the range of 400 to 6,000 A, more preferably 1,000 to 6,000 A. The catalyst is especially useful in the processing of reduced crudes and other heavy feeds. The method involves incorporating a relatively large amount of selected carbon black solids into the catalyst matrix material. The carbon black is subsequently removed by converting it to gaseous carbon oxides by oxidation at elevated temperatures. Its removal provides a pore volume greater than 0.10 cc/gm in pores greater than 400 Å, preferably 0.15 cc/gm with at least 0.10 cc/gm in pores greater than 1,000 Å, more preferably at least 0.20 cc/gm with at least 0.15 cc/gm in pores greater than 1,000 Å. Relative to the prior art, the invention reliably and predictably increases the pore volume comprises of these large pore sizes.

Carbon black may be added, along with other solids such as zeolite and clay, during the formation of the catalyst matrix material. Alternately, the carbon black may be added after the basic catalyst composition has been prepared but before final drying, as for example, by forming a slurry of prepared catalyst composition followed by dispersing the carbon black within the slurry and then spray drying the resulting suspension. Carbon black may also be added to the zeolite component either prior to or during the formation of the aluminosilicate crystals.

Carbon black differs from other types of carbon, such as charcoal, and from other types of fillers such as flour or cellulose fibers, in that it exists as very small reticulated particles and is substantially non-porous in most of its forms. Each reticulated particle is itself comprised of smaller "primary" carbon black particles. Primary carbon black particles are essentially spherical, the diameter of the sphere varying depending upon the method of manufacture. The primary particles in turn are composed of several thousand microcrystallite bundles stacked together in a random order and each bundle consists of several polynuclear aromatic platelets which are stacked in a not quite parallel manner. The carbon blacks of the present invention possess to a greater or lesser extent a basic property called "structure". Structure refers to the degree to which the primary particles are bound together into a 3-dimensional primary chain network making up the reticulated particle. An idealized reticulated particle of carbon black is illustrated in FIG. 1. While not intending to be bound by any one theory, it is believed that the primary particles may be fused together or share common microcrystallite bundles or planes to make up the primary chains. This primary reticulated structure is to be distinguished from secondary or reversible structures which result from van der Waals forces between individual reticulated particles. Primary carbon black structures exhibit a pronounced tendency to agglomerate into secondary reticulated structures when dispersed in almost all media.

The carbon black of the present invention is preferably produced in refractory-lined furnace reactors by pyrolysis of highly aromatic refinery by-product oils. These oils are subjected to temperatures of about 1,400° to 1,650° C. in a reaction zone maintained at conditions producing an endothermic reaction which strips atomic hydrogen from the aromatic hydrocarbon molecules to leave aromatic carbon nuclei. The resulting reticulated particles in the form of a black "smoke" are quenched in a downstream tunnel by water injection at a point several feet from the reaction zone. In this method of manufacturing carbon black, the primary particle size can be closely controlled and produces particle diameters in the range of about 200 to 900 Å. These primary particles are simultaneously bound together to form primary reticulated chains having lengths in the range of about 500 to 30,000 Å. Both structure and particle zie may be closely controlled through the design of the oil injection nozzle, reaction chamber geometry, pyrolysis temperature, residence time, and the intensity of gaseous turbulence.

Another important feature of carbon black is that it contains less than about half the amount of hydrogen theoretically needed to bond all edge portions of the polynuclear aromatic platelets and it is believed that the particles contain many unsatisfied valences or free radicals. A number of elements, such as oxygen and sulfur, may interact at some of the peripheral positions of these micrographic platelets so as to form complexes which are generally analogous to the functional groups of organic compounds. The principal surface groups on carbon black have been identified in the literature as carboxylic acid, phenolic hydroxyl and quinone groups, and possibly peroxide and lactone groups. In addition to accepting or trapping free radicals, it has been suggested that functional groups at the carbon black surface can also generate free radicals, or at least can initiate free radical reactions. It is believed that these organic functional groups may assist in forming both the unfired and fired catalyst compositions of the present invention.

It should also be noted that carbon black is an amorphous form of carbon as opposed to graphite which is a soft crystalline form of carbon that differs greatly in properties from amorphous carbon. The thermal conductivity of amorphous carbon is relatively high and is equivalent to some metals. Carbon black also has a very low co-efficient of thermal expansion and a high resistance to thermal shock. It is believed that these features contribute to relatively rapid rates of carbon burnout and large feeder pores of substantially uniform diameter.

A preferred type of carbon black meets the specifications of ASTM No. N-219. These blacks have relatively low structure and are made using an intermediate super-abrasion furnace. Such blacks are available from Ashland Chemical (United N-219), Cabot (Regal 600), Columbian (Neotex 130), Continental (Continex ISAF-LS), and Phillips (Philblack N-219). United N-219L is preferred as it is not compacted but supplied loose at relatively low bulk density compared to pelleted or compacted blacks.

The average primary particle diameter of this black is about 300 Å and it has an ASTM Iodine Number of about 115 (a measurement of surface area per unit weight correlating well with nitrogen absorption measurements for furnace blacks). The relatively low structure of this black is indicated by a low DBP Absorption value of about 0.78 cubic centimeters per gram (the DBP Absorption value is indicative of the degree of linkage between primary carbon black particles).

One of the principal objects of the invention is to disperse the carbon black sufficiently in the catalyst forming media so that formation of secondary CB structures through agglomeration of primary CB structures can be significantly controlled. Some of the more effective dispersants for carbon black in aqueous media are hexadecyltrimethylammonium bromide, an ethoxylated alcohol sulfate sold under the brand name Triton X-100, a sodium lignosulfonate sold under the brand name Marasperse CBO-3, and mixtures thereof. These dispersants are used in amounts generally proportional to the weight of carbon black added, preferred proportions being in the range of about 0.05 to 1.0 weight percent of carbon black, more preferably about 0.1 percent. Quaternary surfactants such as Quaterny O, succinates such as Aerosol, and other ethoxylated alcohol sulfates may also be used.

With carbon black, it has been found that the most predominant feeder pore size can be controlled to a significant extent both by the amount of carbon black used and the amount and effectiveness of the dispersant used to suspend the carbon black in an aqueous medium. It is believed that the degree of dispersion versus the degree of agglomeration of the primary reticulated CB particles is a controlling factor in determining whether the predominant feeder pore sizes are in the lower or the upper portion of the preferred pore size range of 500 to 6,000 Å. Thus, lower carbon black concentrations in combination with the most effective dispersants provide an increased number of pores with effective diameters in the range of 400 to 1,000 Å when using primary carbon black particles having an average diameter of about 300 Å. Larger concentrations of carbon black and lower and/or less effective concentrations of carbon black dispersants provide predominant feeder pore sizes in the range above 1,000 Å. This phenomenon is believed to be due to the formation of feeder pores by agglomerates of two or more individual reticulated CB particles.

The amount of carbon black used in preparation of the unfired catalyst will therefore depend on the extent to which large feeder pores are desired in the final catalyst structure. Other factors include the final attrition resistance desired. Generally, the amount of carbon black should be in the range of 1 to 35 percent by weight of unfired product. Too little carbon black will not produce a sufficient number of large pores and too much carbon black will result in a catalyst having relatively low attrition resistance. Accordingly, preferred amounts of carbon black are in the range of about 2 to 30 percent by weight, more preferably 5 to 15 percent by weight, of the unfired product.

Another factor to be considered in selecting the amount and type of carbon black is the average effective diameter of the hydrocarbon molecules in the feedstock. The average diameter referred to here is the statistical average of the largest effective dimension of the molecules boiling above 1025° F. The feeder pores should have an average effective diameter at least equal to this average feedstock dimension, but should not exceed about 10 times this dimension so as not to decrease unduly the surface area and, correspondingly, the number of catalytic sites available for the cracking reaction. Accordingly, the ratio of average feeder pore diameter to average hydrocarbon diameter should be in the range of 2 to 10 more preferably 4 to 8, most preferably 5 to 8.

Another important feature of the invention is that the carbon black suspension, preferably an aqueous medium, can be mixed uniformly with a catalyst slurry and the resulting composite suspension spray dried to form substantially uniform microspheres within the preferred range of particle sizes described below. By comparison, prior art techniques using a decomposable solid for introducing large pores into a matrix involve the formation and extrusion of a viscous paste which then has to be dried and broken up. This results in catalyst particles having a wide range of diverse shapes and sizes which have to be sifted in order to provide a catalyst of any uniformity. In addition, the types of decomposable solids used in the prior art produce low activity catalysts with excessively large pores, the pore size range in any given mix being virtually uncontrollable.

After being intimately mixed with the matrix material and any other ingredients, such as zeolite and/or filler components, the composite is shaped and dried to produce an unfired catalyst composite. This shaped composite is then heated to burn out the carbon black and produce a final catalyst product containing a significant volume of large feeder pores within the desired size ranges. The temperature experienced by the catalyst particles should not cause objectionable changes in the structure of either the zeolite or the supporting matrix. Where carbon black is removed during manufacture, burn out is initiated at about 500° F. and the firing time varies in accordance with the temperature selected, higher temperatures requiring shorter firing times. Where carbon black is burned out in the process unit during regeneration, the temperature should not exceed about 1,500° F. to avoid damage to the zeolite. Preferred firing temperatures are in the range of about 1,000° to 1,450° F., with corresponding firing times from about three hours to as low as a few minutes, such as associated with catalyst hold-up in a regenerator. Where carbon black is burned out of the composition prior to in situ formation of the zeolite, temperatures as high as 2,000° F. may be tolerated.

The invention is not restricted to the use of contact agents containing any specific matrix components or catalytic promoter. Any matrices and/or promoters of the prior art may be used in combination with carbon black for the production of feeder pores in solid catalysts which may be of any suitable shape and size. For example, carbon black may be used to provide feeder pores in synthetic silica-alumina catalysts of the type described in U.S. Pat. No. 3,034,994 to Braithwaite, et al., which patent is incorporated herein by reference. However, it is preferred to use this or a similar silica-alumina composition as a matrix for supporting a superactive zeolite component. It is to be further understood that other promoters, such as catalytically active metals or metal compounds, may be used in place of or along with a zeolitic promoter. A preferred catalyst of the present invention therefore comprises three main components, namely, a catalytically active or inactive matrix material, a superactive catalytic promoter dispersed in the matrix material, and a carbon black initially dispersed in the matrix but removable therefrom by combustion.

Virtually any refractory oxide material capable of maintaining stable pore characteristics may be used as the matrix for the catalyst of this invention. A preferred matrix composition is one having sufficient acid sites to provide significant cracking activity, particularly for the high molecular weight components of the feed. It is therefore a further object of the invention to employ a catalyst matrix in which significant catalysis of the heavy hydrocarbon molecules boiling above 1,025° F. is affected in the feeder pores. Catalysis in these macropores may be affected by acidic sites either in the matrix itself or on exposed outer surfaces of the superactive zeolite. It is believed that conversion and selectivity is significantly improved if these feed components are initially cracked in the matrix to smaller size molecules capable of entering the much smaller zeolite pores. Less reliance on thermal cracking for these types of reactions gives improved product distribution and gasoline yield and better overall product quality, i.e., less methane, ethane, ethylene, thermal coke, thermal gas oil, and thermal gasoline.

Figure 2:
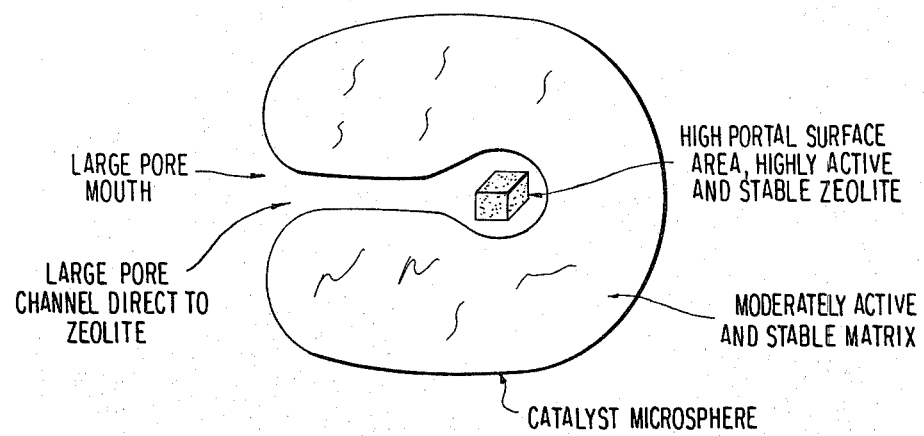
FIG. 2 is a diagramatic representation of a catalyst particle made according to the invention.
Figure 3:
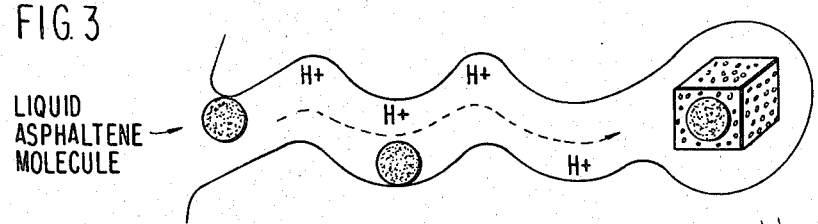
FIG. 3 is a diagramatic representation of a feeder pore of the invention enlarged relative to the view of FIG. 2.
Figure 4:
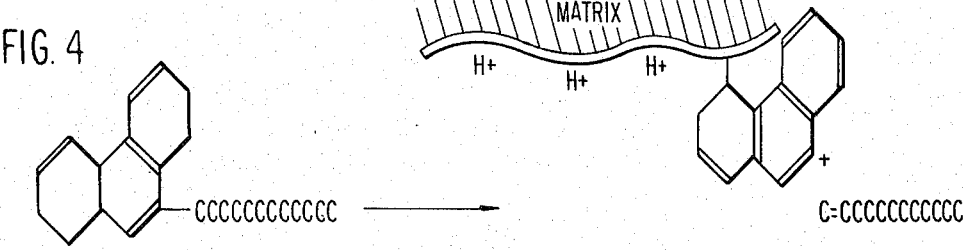
FIG. 4 is a diagramatic representation of cracking a polynuclear aromatic hydrocarbon within the matrix of the catalyst of the invention.
Figure 5:
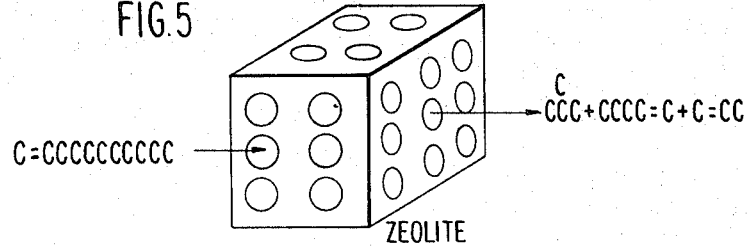
FIG. 5 is a diagramatic representation of cracking the aliphatic fragment of FIG. 4 in the zeolitic component of the catalyst of the invention.

A catalyst microsphere made according to the invention is illustrated in FIG. 2. The mechanism for trapping heavy liquid asphaltenes in the matrix feeder pores so as to reduce the number reaching and blocking zeolitic pores is illustrated in FIG. 3. FIG. 4 shows diagramatically the cracking of a heavy polynuclear aromatic at an acidic site (H+) in the matrix. The straight chain fragment from the matrix cracking of FIG. 4 maythen be cracked and reformed by the zeolite as illustrated in FIG. 5.

The matrix material should possess good hydro-thermal stability. Examples of materials exhibiting relatively stable pore characteristics are alumina, silica-alumina, silica, silica-magnesia, magnesia-alumina, silica-zirconia, clays such as kaolin, metakaolin, halloysite, anauxite, dickite and/or macrite, and combinations of these materials. Other clays, such as natural montmorillonite, synthetic mica montmorillonite (SMM), and/or pillared layered clays (PLC) may be added to increase the acidity of the matrix. Clay may be used in its natural or thermally modified states. The preferred matrix of U.S. Pat. No. 3,034,994 is a semisynthetic combination of clay and silica-alumina. Preferably the clay is mostly a kaolinite and is combined with a synthetic silica-alumina hydrogel or hydrosol. This synthetic component forms preferably about 15 to 75 percent, more preferably about 20 to 25 percent, of the fired catalyst in weight. The proportion of clay is such that the catalyst preferably contains after firing about 10 to 75 percent, more preferably about 30 to 50 percent, clay by weight. A most preferred composition of the matrix contains approximately twice as much clay as synthetically derived silica, alumina or silica-alumina. Synthetically derived silica-alumina should contain 55 to 95 percent by weight of silica ($SiO_2$), more preferably about 75 percent. After introduction of the zeolite and/or other promoters, the composition is preferably slurried and spray dried to form catalyst microspheres. The particle size of the spray dried matrix is generally in the range of about 5 to 160 microns, preferably 40 to 80 microns.

Various processes may be used in preparing the synthetic silica-alumina, such as those described in U.S. Pat. No. 3,034,994. One of these processes involves gelling an alkali metal silicate with an inorganic acid while maintaining the pH on the alkaline side. An aqueous solution of an acidic aluminum salt is then intimately mixed with the silica hydrogel so that the aluminum salt solution fills the silica hydrogel pores. The aluminum is thereafter precipitated as a hydrous alumina by the addition of an alkaline compound.

As a specific example of this method of preparation, a silica hydrogel is prepared by adding sulfuric acid with vigorous aggitation and controlled temperature and concentration conditions to a sodium silicate solution. Aluminum sulfate in water is then added to the silica hydrogel with vigorous aggitation to fill the gel pores with the aluminum salt solution. An ammonium solution is then added to the gel with vigorous aggitation to precipitate the aluminum as hydrous alumina which combines with the silica to produce silica-alumina on the surface of the silica hydrogel, after which the hydrous gel is processed, for instance, by separating a part of the water on vacuum filters and then drying, or more preferably, by spray drying the hydrous gel to produce microspheres. The dried product is then washed to remove sodium and sulfate ions, either with water or a very weak acid solution. The resulting product is then dried to a low moisture content, usually less than 25 percent by weight, e.g., 10 percent to 20 percent by weight, to provide the finished catalyst product.

The silica-alumina hydrogel slurry may be filtered and washed in gel form to affect purification of the gel by the removal of dissolved salts. This may enhance the formation of a continuous phase in the spray dried microspheric particles. If the slurry is prefiltered and washed and it is desired to spray dry the filter cake, the latter may be reslurried with enough water to produce a pumpable mixture for spray drying. The spray dried product may then be washed against and given a final drying in the manner previously described. Spray driable compositions to which carbon black can be added and spray drying techniques usable with the present invention are also described in U.S. Pat. No. 3,867,308 to Elliott and U.S. Pat. No. 4,126,579 to Flaherty, et al., which patents are incorporated herein by reference.

Suitable catalytically active promoters other than zeolites may be used and include metals or a catalytic compound of metals such as Pb, Sn, Bi, Ge, Sc, Ti, Cr, Mn, Co, Zn, Y, Nb, Mo, Ma, Ru, Rh, Pd, La, Hf, Ta, W, Re, Os, Ir, Pt, Zr, Ac, Th, Pa, and U and the like. Additional contact agents for the matrix include metal oxides and sulfides, selenide, teluride, halides, phosphates, manganates, molybdates, chromates, bi-chromates and the like. These components may be used alone or in addition to a superactive zeolite. In the latter case, these elements and/or compounds may increase the catalytically active sites available in the matrix. These additional promoters may be used in concentration ranges generally from about 0.5 percent to about 20 percent, more preferably about 1 to 5 percent by weight of fired catalyst.

The catalytically active promoter for a preferred catalyst composition is a crystalline aluminosilicate zeolite, commonly known as molecular sieves. Molecular sieves are initially formed as alkali metal aluminosilicates, which are dehydrated forms of crystalline hydrous siliceous zeolites. However, since the alkali form does not have appreciable activity and alkali metal ions are deleterious to cracking processes, the aluminosilicates are ion exchanged to replace sodium with some other ion such as, for example, ammonium and/or rare earth metal ions. The silica and alumina making up the structure of the zeolite are arranged in a definite crystalline pattern containing a large number of samll uniform cavities interconnected by smaller uniform channels or pores. The effective size of these pores is usually between about 4 Å and 13 Å.

The zeolites which can be employed in accordance with this invention include both natural and synthetic zeolites. The natural occurring zeolites include gmelinite, clinoptilolite, chabazite, dechiardite, faujasite, heulandite, erionite, analcite, levynite, sodalite, cancrinite, nepheline, lcyurite, scolicite, natrolite, offretite, mesolite, mordenite, brewsterite, ferrierite, and the like. Suitable synthetic zeolites include zeolites Y, A, L, ZK-4B, B, E, F, H, J, M, Q, T, W, X, Z, ZSM-types, alpha, beta and omega. The term "zeolites" as used herein contemplates not only aluminosilicates but substances in which the aluminum is replaced by gallium and substances in which the silicon is replaced by germanium.

The zeolite materials utilized in the preferred embodiments of this invention are synthetic faujasites which possess silica to alumina ratios in the range from about 2.5 to 7.0, preferably 3.0 to 6.0 and most preferably 4.5 to 6.0. Synthetic faujasites are widely known crystalline aluminosilicate zeolites and common examples of synthetic faujasites are the X and Y types commercially available from the Davison Division of W. R. Grace and Company and the Linde Division of Union Carbide Corporation. The ultrastable hydrogen exchanged zeolites, such as Z-14XS and Z-14US from Davison, are particularly suitable. In addition to faujasites, other preferred types of zeolitic materials are mordenite and erionite.

The preferred synthetic faujasite is zeolite Y which may be prepared as described in U.S. Pat. No. 3,130,007 and U.S. Pat. No. 4,010,116, which patents are incorporated hereby by reference. The aluminosilicates of this latter patent have high silica ($SiO_2$) to alumina ($Al_2O_3$) molar ratios, preferably above 4, to give high thermal stability.

The following is an example of a zeolite produced by the silication of clay. A reaction composition is produced from a mixture of sodium silicate, sodium hydroxide, and sodium chloride formulated to contain 5.27 mole percent $SiO_2$, 3.5 mole percent $Na_2O$, 1.7 mole percent chlorine and the balance water. 12.5 parts of this solution are mixed with 1 part by weight of calcined kaolin clay. The reaction mixture is held at about 60° F. to 75° F. for a period of about four days. After this low temperature digestion step, the mixture is heated with live steam to about 190° F. until crystallization of the material is complete, for example, about 72 hours. The crystalline material is filtered and washed to give a silicated clay zeolite having a silica to alumina ratio of about 4.3 and containing about 13.5 percent by weight of $Na_2O$ on a volatile free basis. Variation of the components and of the times and temperatures, as is usual in commercial operations, will produce zeolites having silica to alumina mole ratios varying from about 4 to about 5. Mole ratios above 5 may be obtained by increasing the amount of $SiO_2$ in the reaction mixture. The sodium form of the zeolite is then exchanged with polyvalant cations to reduce the $Na_2O$ content to less than about 5 percent by weight, and preferably less than 1.0 percent by weight. Procedures for removing alkali metals and putting the zeolite in the proper form are well-known in the art as described in U.S. Pat. Nos. 3,293,192; 3,402,996; 3,446,727; 3,449,070; and 3,537,816; which patents are incorporated herein by reference.

As previously indicated, the carbon black ingredient of the present invention may be admixed with the zeolite forming composition prior to crystallization of the zeolite and the carbon black component later burned out to form large feeder pores between the zeolite crystals in the resulting agglomerate.

The zeolites and/or other promoters can be suitably dispersed in matrix materials for use as cracking catalysts by methods well-known in the art, such as those disclosed, for example, in U.S. Pat. Nos. 3,140,249 and 3,140,253 to Plank, et al.; U.S. Pat. No. 3,660,274 to Blazek, et al.; U.S. Pat. No. 4,010,116 to Secor, et al.; U.S. Pat. No. 3,944,482 to Mitchell, et al.; and U.S. Pat. No. 4,079,019 to Scherzer, et al.; which patents are incorporated herein by reference.

The amount of zeolitic material dispersed in the matrix based on the final fired product should be at least about 10 weight percent, preferably in the range of about 25 to 40 weight percent, most preferably about 35 to 40 weight percent. More than one type of zeolitic particles, such as zeolites with different functions and/or selectivities, and zeolitic particles in combination with particles of metals or other catalytic materials may be employed together to make up these amounts of total promoter ingredient. For example, particles of hydrdesulfurizing catalyt as in U.S. Pat. No. 3,770,617 may be mixed with particles of a cracking catalyst as in 4,010,116. The upper ranges of zeolite concentrations, together with a much less but significantly active matrix, are preferred to provide a catalyst with ultrahigh cracking activity even at large pore volumes and relatively low surface areas.

Crystalline aluminosilicate zeolites exhibit acidic sites on both interior and exterior surfaces with the largest proportion of total surface area and cracking sites being internal to the particles within the crystalline micropores. These zeolites are usually crystallized as regularly shaped, discreet particles of approximately 0.1 to 10 microns in size and, accordingly, this is the size range normally provided by commercial catalyst suppliers. To increase exterior (portal) surface area, the particle size of the zeolites for the present invention is preferably in the range of less than 0.1 to about 1 micron and more preferably in the range of less than 0.1 micron. The preferred zeolites are thermally stabilized by heating to temperatures of at least 1,000° F. and then further exchanged with hydrogen ions and/or rare earth ions. These zeolites are steam stable to about 1,650° F.

Feeder pore content of the catalyst within the size range of about 400 to 6,000 Å is provided in the main by the preparative method of the invention. Macropores of less than 400 Å may be produced by this method and may also be introduced into the catalyst matrix by prior art methods for preparing such matrices. The micropore content of the catalyst in the size range below 20 Å is provided principally by the zeolite particles per se. Since the amount of zeolite used may vary widely, the micropore content of the catalyst will be variable by a similar amount. The fraction of total pore volume provided by micropores of 20 Å or less also will vary depending upon the fraction of large feeder pores introduced by the carbon black component.

The surface area of the zeolitic component in the catalyst may be estimated by multiplying the surface area of the pure zeolite (usually about 800 to 900 $m^2$/gm) by the percentage of zeolite in the final catalyst. Total pore volume including the feeder pore volume of the matrix should be at least 0.2 cc/gm, preferably more than 0.4 cc/gm. The upper limit for total matrix pore volume is best expressed as the amount of contact surface area provided in the final catalyst matrix. In general, the minimum surface area of a satisfactory catalyst matrix is about 20 square meters per gram, preferably at least 30 square meters per gram, more preferably at least 40 square meters per gram. These parameters are believed to provide sufficient volume in the form of large feeder pores to reasonably minimize diffusion limitation effects, yet not so large a volume as to unduly reduce the availability of acidic sites or adversely affect the physical properties, e.g., attrition resistance, of the catalyst.

The introduction of CB feeder pores, as a practical matter, causes no appreciable change in the volume and size distribution of micropores in the zeolite and macropores produced in the matrix by other mechanisms. Thus, the macropore content of the catalyst particles produced by the carbon black of the invention is readily obtained by the difference in pore volume between the unfired and fired catalyst composition, provided there is no significant sintering of the matrix material. The determination of feeder pore volume is by the conventional mercury porosimetry method referenced above.

In order to test the activity of a catalyst, it is the practice in the petroleum cracking art to measure the catalyst activity by a bench-scale test. Although various tests have been proposed, one test widely accepted by the industry at the present time is known as the microactivity test or "MAT". The microactivity test and standard procedures for obtaining "MAT Activity" are described below. Because the MAT test range is appropriate for equilibrium (used) zeolite catalyst instead of virgin (unused) catalyst, virgin catalyst of the present invention is treated with 97-100% steam at 1,450° F. for 5 hours to provide a standard reduction in its activity before it is tested by the MAT procedure.

Having thus described the catalyst of the invention broadly, the following examples are offered to illustrate methods for its preparation in more detail.

Example 1

2.1 gms of carbon black pellets (N-339 from Ashland Chemical Company) were placed in 350 ml of deionized water containing 0.03 gm of hexadecyltrimethylammonium bromide and 0.03 gm of Triton X-100 dispersants. This mixture was agitated ultrasonically with an Artex Sonic probe at 300 watts for 30 minutes, and the resulting carbon black suspension added to 700 ml of water along with 22.2 gm of Kaopaque 10 Kaolinite. This slurry was mixed for 30 minutes with a Premier High Viscosity Dispersator and then 23.4 gm of rare earth zeolite was added, along with 5 ml of PQ N-Brand sodium metasilicate as a dispersant for the clay and zeolite. The resulting slurry was mixed for an additional 30 minutes with the Dispersator and then 120 ml of sodium metasilicate and 200 ml of water were added with mixing for 10 more minutes. 180 ml of a 11.5 wt % sulfuric acid solution were added slowly while mixing continued to partially neutralize the slurry and precipitate silica gel. This silica gel contained uniformly dispersed carbon black and clay and was aged for 1 hour at 110° F. to increase the size of interstitial cavities within the gel. Mixing was then resumed and a 18 wt % solution of aluminum sulfate, prepared from 108.4 gm $Al_2(SO_4)_3 \cdot 18H_2O$ and 200 ml of water at 120° F., was added to the silica gel and mixing continued for 15 minutes at 110° F. This slurry was then neutralized by adding 68 ml of concentrated $NH_4OH$ to precipitate alumina gel. The silica and alumina gel mixture was filtered and the resulting gel cake washed three times with 3L of water at 150° F. The washed gel cake was then dried at 500° F. for 16 hours and the dried cake ground into small solid particles. These particles were then exchanged at 200° F. for 1 hour with 1L of 1.0M rare earth chloride solution. The exchanged particles were filtered and washed three times with 2L of water at 150° F. and dried at 500° F. for 16 hours. After drying, the carbon black was burned out by firing the catalyst particles in air at 1,000° F. until the catalyst became white in color (about 3 hours). This procedure produced about 100 gm of dry catalyst particles consisting essentially of 20 wt % zeolite and 20 wt % clay substantially uniformly dispersed in 60 wt % of a silica-alumina matrix containing about 75 wt % $SiO_2$.

Examples 2–5

The quantity of carbon black used in Example 1 above provided about 2 wt % carbon black in the unfired catalyst composite. In Examples 2–5, the same preparation procedure was followed but the amount of carbon black was changed to 4.3, 11.6, 27.1 and 44.6 gms giving a carbon black wt % in the unfired composites of 4, 10, 20, and 30, respectively. In these examples, the amounts of the other ingredients remained the same except that the amount of carbon black dispersant was varied in proportion to the amount of black used. Thus, the weights of hexadecyltrimethlyammonium bromide and Triton X-100 used in these examples were each approximately 1% of the weight of carbon black added to the deionized water.

The changes in pore volume produced by the carbon black of Examples 1 through 5 are shown in Table 1 relative to a fired control sample containing no carbon black. In order to show the effects of firing alone on pore size distribution, the control sample without carbon black was also fired and the resulting pore volume changes for this sample are reflected in the first column of Table 1 under the heading "Control".

The data shown in Table 1 indicates that firing of the control sample containing no carbon black caused a slight decrease in pore volume in all pore size ranges. By comparison, the firing of samples containing carbon black resulting in significant increases of porosity in the ranges above both 400 Å and 1,000 Å. Several composites also showed significant increases in porosity near 60 Å for reasons not yet explained, but which could involve differences in aging the hydrogel. Sample No. 5, which contained 30 wt % carbon black, did not form an adhering cake when filtered and dried, but instead produced a fine powder as an unfired product.

TABLE 1

| POROSITY EFFECTS OF CARBON BLACK ADDITIONS | | | | | | |
|---|---|---|---|---|---|---|
| Sample No. | Control | 1 | 2 | 3 | 4 | 5 |
| Carbon Black, wt % | 0 | 2 | 4 | 10 | 20 | 30 |
| Pore Diameter Range In Å | | Pore Volume Changes in cc/gm as Compared to fired control sample without carbon black. | | | | |
| 30–35 | −0.012 | 0.017 | −0.017 | 0.040 | −0.013 | 0.014 |
| 35–40 | −0.009 | 0.006 | 0.045 | 0.015 | 0.007 | 0.008 |
| 40–60 | −0.032 | 0.184 | 0.139 | 0.040 | 0.135 | 0.024 |
| 60–80 | −0.007 | 0.044 | 0.005 | 0.006 | 0.026 | 0.005 |
| 80–100 | −0.010 | 0.007 | 0.013 | 0.009 | 0.008 | 0.009 |
| 100–200 | −0.015 | 0.004 | 0.036 | 0.034 | 0.029 | 0.026 |
| 200–400 | −0.002 | 0.004 | 0.012 | 0.078 | −0.010 | −0.026 |
| 400–1000 | −0.010 | −0.009 | 0.027 | 0.026 | 0.073 | 0.137 |
| 1000–6000 | −0.002 | 0.020 | 0.015 | 0.037 | 0.154 | 0.222 |
| Pore Volume Change For 100–6000Å, cc/g | −0.029 | 0.019 | 0.090 | 0.175 | 0.256 | 0.359 |

TABLE 1-continued
POROSITY EFFECTS OF CARBON BLACK ADDITIONS

| Sample No. | Control | 1 | 2 | 3 | 4 | 5 |
|---|---|---|---|---|---|---|
| Carbon Black, wt % | 0 | 2 | 4 | 10 | 20 | 30 |
| Pore Diameter Range In Å | Pore Volume Changes in cc/gm as Compared to fired control sample without carbon black. | | | | | |
| Total Pore Volume Change, cc/g | −0.099 | 0.277 | 0.275 | 0.285 | 0.409 | 0.419 |
| Total Pore Volume, cc/g | 0.253 | 0.774 | 0.690 | 0.477 | 0.992 | 0.829 |

Examples 6–9

The catalyst samples of Examples 6 through 9 were prepared following the same basic procedure of Examples 1 through 5 except the amount of clay was increased and the amount of silica and alumina gel decreased so that the amounts of clay and of silica-alumina gel were approximately equal in the final fired product, with the resulting silica-alumina matrix containing about 75 wt % $SiO_2$. In addition, instead of filtering and drying to produce a gel cake, the final neutralized slurry was spray dried to form microspheres of catalyst. These microspheres were then washed, exchanged with rare earth chloride solution, rewashed, and dried at 300° F. for 16 hours in a manner similar to the gel cake and ground particles of Examples 1-5. Spray drying produces smaller and more uniform particle sizes than grinding gel cake and is preferred for providing a more uniform and fluidizable catalyst. The average size of the spray dried particles is preferably within the range of about 40 to 80 microns.

The changes in pore volume produced by the carbon black of Examples 6 through 9 are given in Table 2. In this comparison, the changes in pore volume were measured relative to a fired control sample containing no carbon black instead of the unfired type of control sample forming the basis for the comparison in Table 1. The changes in porosity exhibited by the samples of Table 2 are consistent with those of Table 1 in that the use of carbon black increased catalyst porosity in the ranges above 400 Å and 1,000 Å. However, no significant increase in porosity occurred in the 40 to 80 Å range, the reason for this variance with the data of Table 1 being uncertain at the present time.

TABLE 2
POROSITY EFFECTS OF CARBON BLACK ADDITIONS

| Sample No. | 6 | 7 | 8 | 9 |
|---|---|---|---|---|
| Carbon Black, wt % | 11.6 | 22.0 | 23.4 | 27.0 |
| Pore Diameter Range in Å | Pore Volume Change in cc/gm as compare to fired control sample without carbon black. | | | |
| Group A | | | | |
| 30–35 | +.004 | 0.022 | 0.017 | +0.006 |
| 35–40 | −0.001 | 0.004 | 0.001 | 0.001 |
| 40–60 | −.007 | −0.051 | −0.042 | −0.068 |
| 60–80 | −.003 | −0.035 | −0.026 | 0.042 |
| 80–100 | 0.006 | −0.009 | −0.013 | −0.011 |
| 100–200 | 0.020 | −0.005 | −0.003 | −0.010 |
| 200–400 | 0.027 | 0.009 | 0.008 | 0.004 |
| 400–1000 | 0.058 | 0.044 | 0.022 | 0.014 |
| 1000–6000 | 0.109 | 0.233 | 0.227 | 0.225 |
| >6000* | 0.233 | −0.032 | 0.481 | 0.225 |
| Group B | | | | |
| 1000–>6000* | 0.342 | 0.201 | 0.708 | 0.450 |
| 400–>6000* | 0.400 | 0.245 | 0.730 | 0.464 |
| 200–>6000* | 0.427 | 0.254 | 0.738 | 0.468 |
| 100–>6000* | 0.447 | 0.249 | 0.735 | 0.458 |
| Group C | | | | |
| 400–6000 | 0.167 | 0.277 | 0.249 | 0.239 |
| 200–6000 | 0.194 | 0.286 | 0.257 | 0.249 |
| 100–6000 | 0.214 | 0.281 | 0.251 | 0.233 |
| Group D | | | | |
| 200–1000 | 0.085 | 0.053 | 0.030 | 0.018 |
| 100–1000 | 0.105 | 0.048 | 0.027 | 0.008 |

*Includes pore sizes above 6000 Å.

Figure 6:
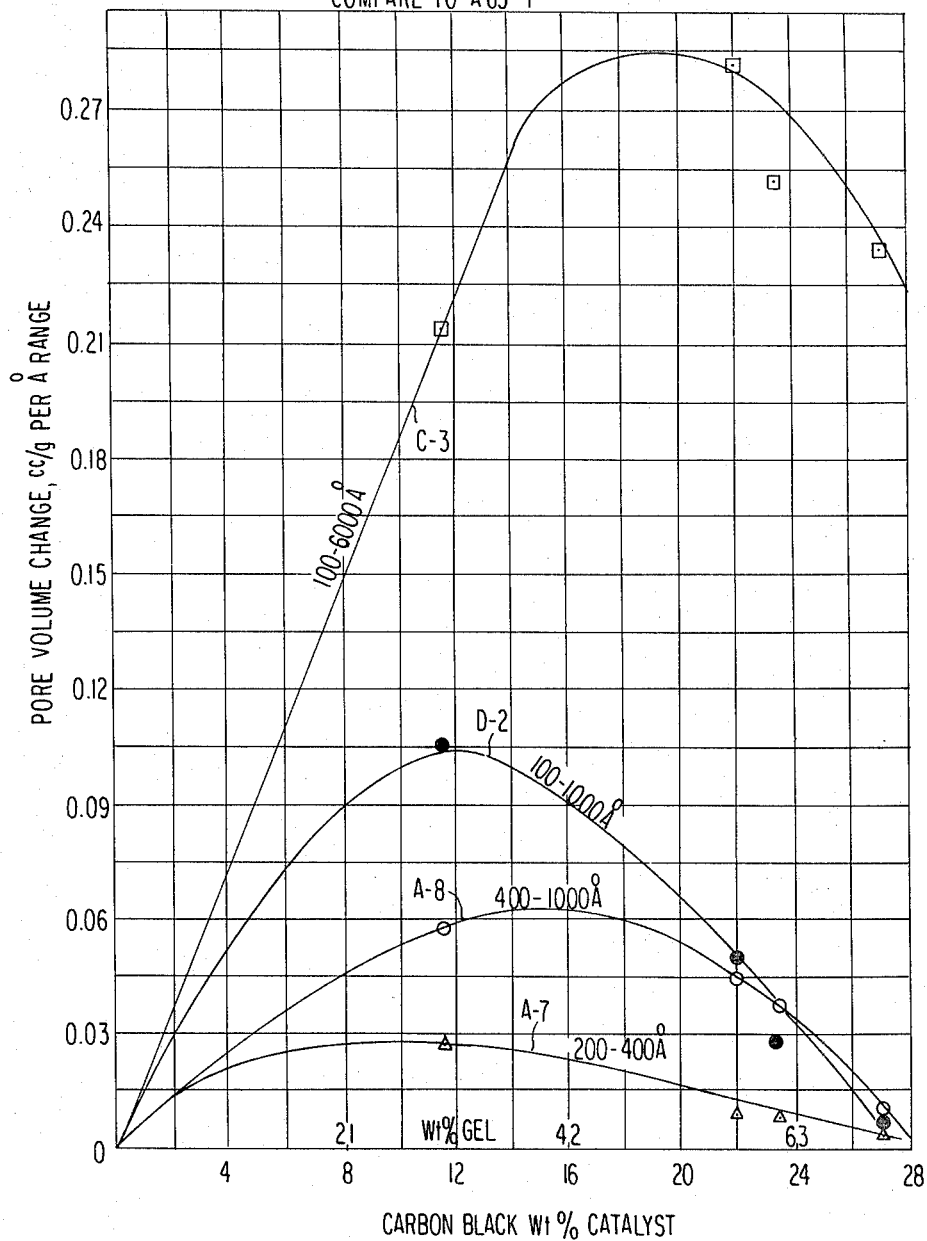
FIG. 6 is a graph showing changes in pore volume ranges relative to changes in the amount of carbon black used in making the catalyst of the invention.

In FIG. 6 of the drawings, the changes in pore volume are plotted against carbon black content for several of the pore diameter ranges in Table 2. The curves of FIG. 6 correspond to the data of Table 2 as follows: curve A-7 represents the pore volume change in the 7th pore diameter range of group A; curve A-8 represents the pore volume change in the 8th pore diameter range of group A; curve D-2 represents the pore volume change in the second pore diameter range of group D; and curve C-3 represents the pore volume change in the third pore diameter range of group C.

The curves of FIG. 6 suggest that the maximum number of feeder pores having diameters in the range of about 100 to 6,000 Å occur with 18 to 19 wt % carbon black in the unfired catalyst composite. This amount of carbon black, which equals about 50% by weight of the dry silica-alumina gel in the unfired composite, increases the volume of pores having diameters greater than 100 Å by about 0.3 cc per gm. Similarly, a carbon black concentration of about 12 wt % in the unfired composite, which is about 30% by weight of the silica-alumina gel present, provides the maximum number of feeder pores in the 100 to 1,000 Å range. This corresponds to an increase in pore volume of about 0.1 cc per gm. As also evident from Table 2, most of the porosity increase at 12 wt % carbon black is due to feeder pores in the 400 to 1,000 Å range. Those feeder pores increased the pore volume by about 0.07 cc/gm, which is about the volume of the carbon black burned out of the sample. The maximum porosity increase in the 200 to 400 Å pore diameter range occurred at about 10 wt % carbon black.

The curves of FIG. 6 further indicate that there is an optimum carbon black concentration to attain maximum porosity in a given pore size range and that lower concentrations are required to give the maximum porosity for smaller diameter pores. This suggests that the pore sizing attainable with carbon black is closely related to the degree to which individual reticulated carbon black particles are separated from each other and dispersed within the silica-alumina matrix, full dispersion becoming more difficult to attain and maintain as concentrations of carbon black in the gel slurry increase. In addition to using lower concentrations of carbon black, more effective carbon black dispersants also increase the proportion of pore sizes in the smaller diameter ranges of feeder pores. One example of a more effective dispersant for carbon black is sodium lignosulfonate which may be used in place of hexadecyltrimethlammonium bromide and/or Triton X-100 dispersants, particularly where more feeder pore diameters approximating the diameter of primary carbon black particles are desired.

Lignin is derived from wood pulp and varies in molecular weight between 1,000 and 50,000. Its basic organic structural unit is a substituted phenylpropane. Lignin dispersants are commercially available under the name Marasperse which is a sodium lignosulfonate of relatively low sulfonation. While not intending to be bound by any one theory or hypothesis, the action of lignin as a dispersant is believed to be electrochemical in nature. When lignin molecules are adsorbed on the solid carbon black or clay particles in aqueous suspension, they impart a negative charge to the particles, causing them to repel each other. Adsorption of lignin molecules on a particle may also create a film which then acts as a physical barrier against direct contact between the particle and the surrounding aqueous media, including silica colloids. These effects are believed to contribute to the production of feeder pore sizes corresponding generally to the transverse diameters of primary reticulated carbon black particles and to improved pore size control. Sodium lignosulfonate is a preferred dispersant for carbon black in the catalyst composition of the invention and is added to the matrix slurry with the carbon black prior to the spray drying or other forming step for shaping the solid catalyst particles. The catalyst compositions containing lignin and the processes for making those compositions are attributed to William P. Hettinger, Jr., James E. Lewis and H. Wayne Beck, all of Ashland Oil, Inc.

Examples 10-11

In a Kady Mill homogenizer, 12 liters of tap water was mixed with 960 grams of aluminum sulfate hydrate and 1.2 liters of $H_2SO_4$. Using an addition rate of 200 ml/min, 9 liters of "N" Brand sodium metasilicate was added to this acid solution while mixing to provide a silica hydrosol. Ten grams of a lignin dispersant called Marasperse and 800 grams of N-219 carbon black were added to the homogenizer and mixed for 5 minutes to disperse carbon black in the silica hydrosol. In a separate container, 10 grams of sodium pyrophosphate ($Na_4P_2O_7$) was added to 11 liters of 2 pH water made with $H_2SO_4$. With vigorous mixing, 11 kg of fine kaolinite clay was added to form a clay slurry. The clay slurry was then combined with the silica hydrosol in the homogenizer and mixed for 5 minutes.

A slurry of NaY zeolite made from 4 liters of 2 pH $H_2O$ and 4 kg of zeolite was quickly added to the homogenizer and mixed for 10 minutes. The resulting slurry was immediately spray dried at 400° C. inlet and 125° C. outlet temperatures in a Niro Atomizer Model V Spray Drier to form catalyst microspheres. Air pressure was 30 psig. One kilogram of the microspheres from the spray drier was washed three times with 4 liters of 150° F. water and filtered. The filter cake was exchanged twice with 3 liters of 1.25 Molar $NH_3Cl$ for 15 minutes each at 150° F. After filtering again, the cake was exchanged 3 times at 150° F. for 30 minutes each with 3 liters of 0.33 N mixed rare earth chloride solution. The solid particles were then finally washed 4 times with 3 liters of 150° F. water and dried at 300° F. for 16 hours to produce Sample No. 10. A portion of this sample was oxidized in air at 1,000° F. in a shallow bed for 4 hours to burn out the carbon black and produce Sample No. 10 R.

Samples 11 and 11 R were prepared by the same procedure except twice as much carbon black was used, the designation "R" meaning regenerated (fired) to burn out the carbon black particles. In the preferred embodiment of the invention, the fired microspheres are further exchanged after firing with a 0.5 N solution of mixed rare earth chlorides at 150° F. for 30 minutes, and then washed 4 times with 150° F. water and dried for 16 hours at 300° F. The firing step to remove carbon black also calcines the zeolite in the composition. This calcination in combination with the further ion exchange provides an ultrastable, hydrothermally resistant zeolite catalyst. A portion of Sample 11 R was further exchanged in this manner to produce Sample 11 RE shown in Table 5.

Table 3 gives an analysis of the compositions of Samples 10 R and 11 R as compared to a commercial Super DX catalyst available from the Davison Division of W. R. Grace and Company. The Davison catalyst has a comparable total pore volume and surface area relative to the sample catalysts. Table 4 gives porosity measurements for Samples 10, 10 R, 11, and 11 R over various pore diameter ranges. This table also shows the change in pore volume, both in cc/gm and as a percentage change, upon burning out the carbon black from Samples 10 and 11 to produce Samples 10 R and 11 R.

Table 5 gives some of the catalytic properties of Samples 10 R, 11 R and 11 RE as compared to the Davison catalyst. The data given was determined by a microactivity test (MAT) based on the procedure found in ASTM test method No. D-3908-80 which is described in more detail below. Although an FCC type feed is used in this standard test so that it is not fully indicative of the performance of the catalyst samples with a carbometallic feed, the data is believed to show the advantage of the invention in reducing the carbon make. Thus, the carbon producing factor (CPF as defined below) and the weight percent coke (relative to feed weight) are significantly lower for Samples 10 R, 11 R and 11 RE of the invention relative to the Davison catalyst as seen in Table 5. It is also significant that the MAT conversion obtained with Sample 10 R was 80 as compared to 73 obtained with the Davison catalyst. Referring to Table 3, it will be seen that the higher conversion was obtained with less zeolite, namely, 6.6 percent intensity for Sample 10 R relative to 13.1 percent intensity for Super DX. The relatively high conversion and low coke producing factors of Sample 10 R demonstrate clearly that the heavier hydrocarbons of even a MAT feed can be cracked by and stripped more effectively from the catalyst of the present invention. The lower conversion experienced with Samples 11 R and 11 RE are attributed to the very low level of zeolite measured for those samples, namely, 3.8 percent intensity.

TABLE 3

Composition of Samples 10R and 11R
Compared to Davison Super DX Catalyst

|  | Sample 10R | Sample 11R | Davison Super DX |
|---|---|---|---|
| Amount of Carbon Black Burned Out, wgt % (1) | 4.5 | 8.3 | None |
| $Al_2O_3$, wgt % | 29.6 | 27.0 | 28.3 |
| $SiO_3$, wgt % | 63.2 | 55.3 | 64.2 |
| $Na_2O$, wgt % | 0.33 | 0.22 | 0.84 |
| Zeolite Intensity, % NaY (2) | 6.6 | 3.8 | 13.1 |
| Hg (<6000 Å) Pore Volume, cc/gm | 0.25 | 0.33 | 0.22 |
| Surface Area, $m^2$/gm | 198 | 197 | 197 |

(1) Carbon Black wgt % based on unfired Samples 10 and 11. All other wgt % are on ignition basis (IB) of final fired catalyst.
(2) Zeolite X-ray intensity of sample as percentage of X-ray intensity of high purity sodium Y zeolite.

TABLE 4

Porosity Measurements of Samples 10, 10R, 11 and 11R

| Pore Dia. Range (Å) | S-10 cc/g (1) | S-10R cc/g (2) | Change, cc/gm | % cge (3) | S-11 cc/gm (1) | S-11R cc/gm (2) | Change, cc/gm | % cge (3) |
|---|---|---|---|---|---|---|---|---|
| 6000–1000 | 0.039 | 0.049 | 0.010 | 25.6 | 0.071 | 0.086 | 0.015 | 21.0 |
| 1000–400 | 0.055 | 0.071 | 0.016 | 29.1 | 0.071 | 0.080 | 0.009 | 12.7 |
| 400–200 | 0.034 | 0.044 | 0.010 | 29.4 | 0.043 | 0.051 | 0.008 | 18.6 |
| 200–100 | 0.025 | 0.040 | 0.015 | 60.0 | 0.031 | 0.057 | 0.026 | 83.9 |
| 100–80 | 0.008 | 0.012 | 0.004 | 50.0 | 0.014 | 0.014 | 0.000 | 0.0 |
| 80–60 | 0.008 | 0.010 | 0.002 | 25.0 | 0.011 | 0.014 | 0.003 | 27.3 |
| 60–40 | 0.013 | 0.012 | 0.001 | 7.7 | 0.017 | 0.017 | 0.000 | 0.0 |
| 40–30 | 0.011 | 0.011 | 0.000 | 0.0 | 0.012 | 0.009 | −0.003 | −25.0 |
| 100–6000 | 0.153 | 0.204 | 0.051 | 33.3 | 0.216 | 0.274 | 0.058 | 26.9 |
| TOTAL | 0.193 | 0.249 | 0.058 | 30.1 | 0.270 | 0.328 | 0.058 | 21.5 |

(1) With Carbon Black.
(2) Regenerated.
(3) Percent porosity change relative to unfired sample 10 or 11 respectively.

TABLE 5

Catalytic Properties After Steaming (1) of Samples 10R, 11R and 11RE
Compared to Davison Super DX Catalyst

|  | Sample 10R | Sample 11R | Sample 11RE | Super DX |
|---|---|---|---|---|
| Mat Conversion, Vol. % | 80 | 59.7 | 58.3 | 73 |
| HPF | 1.3 | 2.1 | 0.7 | 0.6 |
| CPF | 0.7 | 0.8 | 0.5 | 1.1 |
| Coke, wgt % Feed | 2.6 | 1.3 | 0.7 | 2.8 |

(1) Each sample was treated with steam (97%) for 5 hours at 1450° F. to simulate a used catalyst at equilibrium FCC conditions.

For comparison purposes with reference to the data of Table 5, two additional samples, designated as Sample Nos. 12 and 13, were prepared following the preparation procedure described above for Sample No. 10, but without the addition of carbon black. These samples yielded MAT volume percent conversions of 73.5 and 79.7, respectively, and carbon producing factors (CPF) of 0.92 and 0.84, respectively, with zeolite intensities of 7.3 and 12.5, respectively. The catalyst of the invention has a relatively high level of cracking activity and is capable of providing high levels of conversion and selectivity at low residence times in the riser. The conversion capabilities of the catalyst may be expressed in terms of the conversion produced during actual operating of an RCC cracking or other conversion process and/or in terms of conversion produced in standard catalyst activity tests.

For example, it is preferred to employ a catalyst which, in the course of extended operation under prevailing process conditions, is sufficiently active for sustaining a level of conversion of at least about 50 percent and more preferably at least about 60 percent. In this connection, conversion is expressed as liquid volume percent based on volume of fresh feed. Conversion is the volume percentage of feedstock that is converted to 430° F. endpoint gasoline, lighter products and coke, and is calculated by subtracting from 100 the volume percentage of those products heavier than the gasoline which remain in the recovered product.

Also, for example, the preferred catalyst may be defined as one which, in its virgin or equilibrium state, exhibits a specified activity expressed as a percentage in terms of MAT (microactivity test) conversion. For purposes of the present invention, the foregoing percentage is the volume percentage of standard feedstock which a catalyst under evaluation will convert to 430° F. end point gasoline, lighter products and coke at 900° F., 16 WHSV (weight hourly space velocity), and 3 C/0 (catalyst to oil weight ratio) using the equipment and procedures specified by ASTM D-32 MAT test D-3908-80 and an appropriate standard FCC feedstock. The WHSV is calculated on a moisture free basis using clean catalyst which has been dried at 1100° F., weighed and then conditioned for a period of at least 8 hours at about 25° C. and 50% relative humidity, until about one hour or less prior to contacting the feed. The feedstock is preferably a sweet light primary gas oil, such as that used by the Davison Division of W. R. Grace and defined as follows:

| API Gravity at 60° F., degrees | 31.0 |
|---|---|
| Specific Gravity at 60° F., g/cc | 0.8708 |
| Ramsbottom Carbon, wt. % | 0.09 |
| Conradson Carbon, wt. % (est.) | 0.04 |
| Carbon, wt. % | 84.92 |
| Hydrogen, wt. % | 12.94 |
| Sulfur, wt. % | 0.68 |
| Nitrogen, ppm | 305 |
| Viscosity at 100° F., centistokes | 10.36 |
| Watson K Factor | 11.93 |
| Aniline Point | 182 |
| Bromine No. | 2.2 |
| Paraffins, Vol. % | 31.7 |
| Olefins, Vol. % | 1.8 |
| Naphthenes, Vol. % | 44.0 |
| Aromatics, Vol. % | 22.7 |
| Average Molecular Weight | 284 |
| Nickel | Trace |
| Vanadium | Trace |
| Iron | Trace |
| Sodium | Trace |
| Chlorides | Trace |
| B S & W | Trace |

| Distillation | ASTM D-1160 |
| --- | --- |
| IBP | 445 |
| 10% | 601 |
| 30% | 664 |
| 50% | 701 |
| 70% | 734 |
| 90% | 787 |
| FBP | 834 |

The gasoline end point and the boiling temperature volume percentage relationships of the products produced in the MAT conversion test may be determined by simulated distillation techniques, for example by modification of the gas chromatographic "Sim-D" technique of ASTM D-2887-73. The results of such simulations are in reasonable agreement with the results obtained by subjecting larger samples of material to standard laboratory distillation techniques.

The catalyst may be introduced into the process of the invention in its virgin form or in other than its virgin form, e.g., one may use equilibrium catalyst withdrawn from another unit such as catalyst that has been employed in the cracking of an FCC feed. Whether characterized on the basis of MAT activity or relative activity, the preferred catalysts may be described on the basis of their activity "as introduced" into the process of the present invention, or on the basis of their "as withdrawn" or equilibrium activity in the process of the present invention, or on both of these bases.

A preferred activity level of virgin and non-virgin catalyst "as introduced" into the process of the present invention is at least about 50%, preferably at least about 60% by MAT conversion. However, it will be appreciated that, particularly in the case of non-virgin catalysts supplied at high addition rates, lower activity levels may be acceptable. An acceptable "as withdrawn" or equilibrium activity level of catalyst which has been used in the process of the present invention is at least about 50% and an activity level of 60% or more on a MAT conversion basis is also contemplated. More preferably, it is desired to employ a catalyst which will, under the conditions of use in the unit, establish an equilibrium activity at or above the indicated levels. Catalyst activities are determined with the catalyst having less than 0.01 coke, i.e., fully regenerated catalyst.

In Table 5, "CPF" stands for Carbon Producing Factor and is defined as the ratio of the amount of coke produced by the test catalyst to the amount of coke produced by a standard catalyst at the same conversion level. "HPF" stands for Hydrogen Producing Factor and is defined as the ratio of the amount of hydrogen produced by the test catalyst to the amount of hydrogen produced by a standard catalyst at the same conversion level. The standard catalyst is chosen from among conventional FCC catalysts, such as for example, zeolite fluid cracking catalysts, and is chosen for its ability to produce a predetermined level of conversion in a standard feed under the conditions of temperature, WHSV (weight hourly space velocity), catalyst to oil ratio and other conditions set forth in the preceding description of the MAT conversion test and in ASTM D-32 MAT test D-3907-80. For standard feed, one may employ the above-mentioned light primary gas oil, or an equivalent FCC feed. Although the equipment employed for the referenced MAT test is not capable of processing RCC feeds, applicants are undertaking to develop an equivalent test for evaluating RCC catalysts using RCC type feeds.

On pages 935–937 of *Hougen and Watson*, "Chemical Process Principles", John Wiley & Sons, Inc., N.Y. (1947), the concept of "Activity Factors" is discussed. This concept leads to the use of "relative activity" to compare the effectiveness of an operating catalyst against a standard catalyst. Relative activity measurements facilitate recognition of how the quantity requirements of various catalysts differ from one another. Thus, relative activity is a ratio obtained by dividing the weight of a standard or reference catalyst which is or would be required to produce a given level of conversion, as compared to the weight of an operating catalyst (whether proposed or actually used) which is or would be required to product the same level of conversion in the same or equivalent feedstock under the same or equivalent conditions. Said ratio of catalyst weights may be expressed as a numerical ratio, but preferably is converted to a percentage basis.

For purposes of conducting relative activity determinations, one may prepare a "standard catalyst curve", a chart or graph of conversion (as above defined) vs. reciprocal WHSV for the standard catalyst and feedstock. A sufficient number of runs is made under ASTM D-3907-80 conditions (as modified above) using standard feedstock at varying levels of WHSV to prepare an accurate "curve" of conversion vs. WHSV for the standard feedstock. This curve should traverse all or substantially all of the various levels of conversion including the range of conversion within which it is expected that the operating catalyst will be tested. From this curve, one may establish a standard WHSV for test comparisons and a standard value of reciprocal WHSV corresponding to that level of conversion which has been chosen to represent 100% relative activity in the standard catalyst. For purposes of the present disclosure, the aforementioned reciprocal WHSV and level of conversion are, respectively, 0.0625 and 75%. In testing an operating catalyst of unknown relative activity, one conducts a sufficient number of runs with that catalyst under D-3907-80 conditions (as modified above) to establish the level of conversion which is or would be produced with the operating catalyst at standard reciprocal WHSV.

Figure 14:
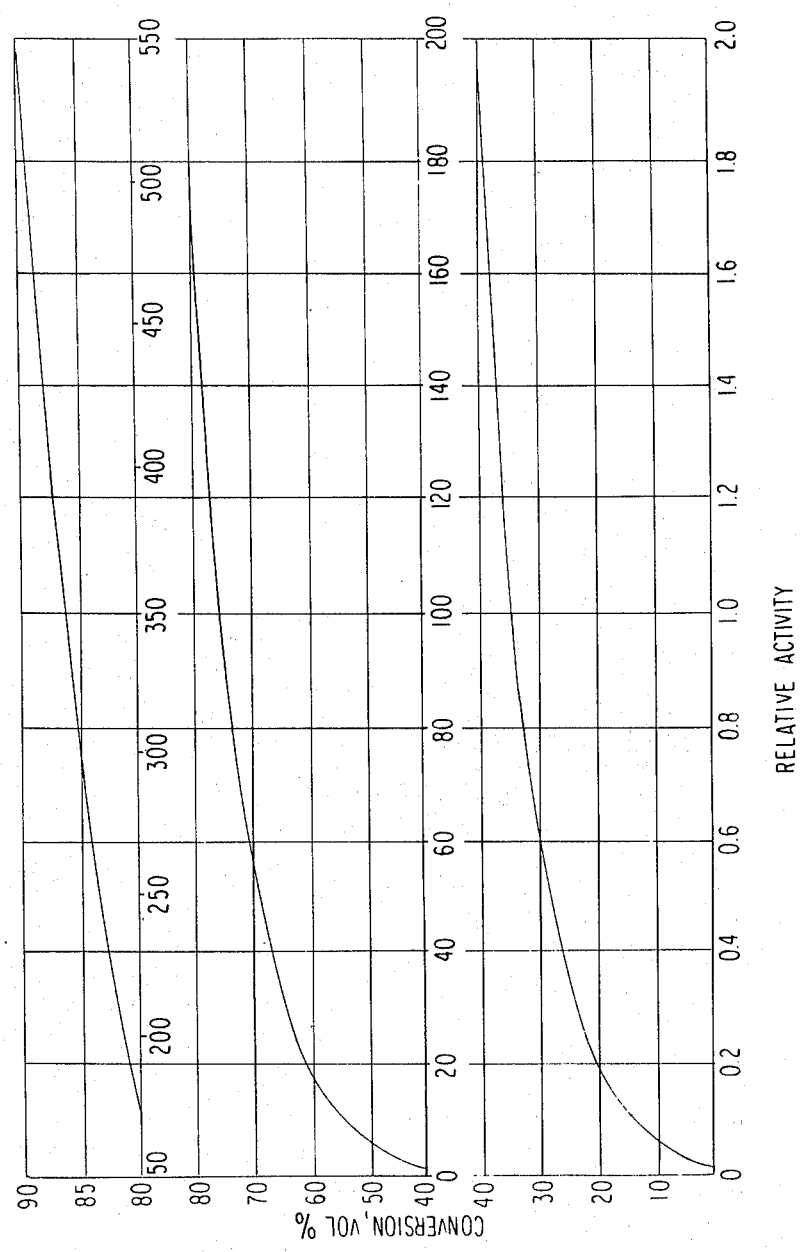
FIG. 14 is a graph showing the change in catalyst relative activity with decreasing vol. % MAT conversion.

Then, using the above-mentioned standard catalyst curve, one establishes a hypothetical reciprocal WHSV constituting the reciprocal WHSV which would have been required, using the standard catalyst, to obtain the same level of conversion which was or would be exhibited by the operating catalyst at standard WHSV. The relative activity may then be calculated by dividing the hypothetical reciprocal WHSV of the standard catalyst by the actual reciprocal WHSV of the test catalyst. The result is relative activity expressed in terms of a decimal fraction, which may then be multiplied by 100 to convert to % relative activity. Relative Activity may also be expressed as follows: relative activity at constant conversion is equal to the ratio of the WHSV of the test catalyst divided by the WHSV of the standard catalyst. To simplify this calculation, a MAT conversion vs. relative activity curve was developed utilizing a standard catalyst of 75 vol. % conversion to represent 100% relative activity. One such curve is shown in FIG. 14. In applying the results of this determination, a relative activity of 0.5, or 50%, means that it would take twice the amount of the operating or test catalyst to give the same conversion as the standard catalyst, i.e., the production catalyst is 50% as active as the reference catalyst.

The relative activity level of virgin and non-virgin catalyst "as introduced" into the process of the present invention is at least about 20%, preferably at least about 40% and more preferably at least about 60%. However, it will be appreciated that, particularly in the case of non-virgin catalysts supplied at high addition rates, lower activity levels may be acceptable. An acceptable "as withdrawn" or equilibrium relative activity level of catalyst which has been used in the process of the present invention is at least about 20% or more, preferably about 40% or more, and more preferably about 60% or more. More preferably, it is desired to employ a catalyst which will, under the conditions of use in the unit, establish an equilibrium activity at or above the indicated levels.

Referring to the idealized carbon particle illustrated in FIG. 1, the individual reticulated CB particle "R" is made up of a series of primary particles "P" of roughly spherical shape held together by atomic and/or interfacial binding forces. Attached to a central chain C—C are a number of side chains S1, S2 and S3, the actual number of side chains varying from particle to particle and the extent of such branching being indicated by a "branching factor", such as given in FIGS. 9B through 12B. The diameter of the particle P determines the transverse diameter of the central chain C—C and is usually about 100 to 1,000 Å, preferably about 300 to 600 Å. The length of the longest chain, such as from point L to point M in FIG. 1, is usually about 500 to 30,000 Å, preferably about 1,000 to 10,000 Å. The average length to diameter ratio for such particles is preferably in the range of 2 to 5 or greater. It is believed that such reticulated particles yield feeder pores roughly of the same dimensions as illustrated by the dotted outline of a feeder pore F in FIG. 1.

The central chain and these side chains are believed to overlap with those of adjacent reticulated particles and thereby provide correspondingly tortuous channels and feeder pore branches in the matrix leading to the zeolite particles supported therein. In addition, two or more reticulated particles may adhere closely together to form an agglomerate mass so that the resulting pore size corresponds to the dimensions of this mass. Such agglomerates are believed to produce pore sizes of 1,000 Å and greater. The degree of agglomeration depends not only upon the particular dispersant used, but also upon the mixing means used and the mixing energy imparted to the carbon black suspension and resulting catalyst slurry. A greater percentage of pore sizes in the range of 400 to 600 Å may be realized with catalyst compositions similar to those of Examples 1 to 9 but using increased agitation in combination with lignosulfonate as the dispersant.

A scanning electron microscope (SEM) was used to make micrographs of some of the carbon black particles useful in the catalyst of the present invention. Copies of those micrographs are presented as FIGS. 9A, 10A, 11A and 12A. Contour plots were also prepared of these reticulated carbon black particles by plotting the particle contours with an X-Y recorder attached to a computer read-out from photogrammetric topography. The contour plots, together with tables of topographical measurements for each particle, are presented in FIGS. 9B, 10B, 11B and 12B which correspond to carbon black types N-339, N-550, N-220 and N-326 shown in FIGS. 9A–12A, respectively.

Figure 13:
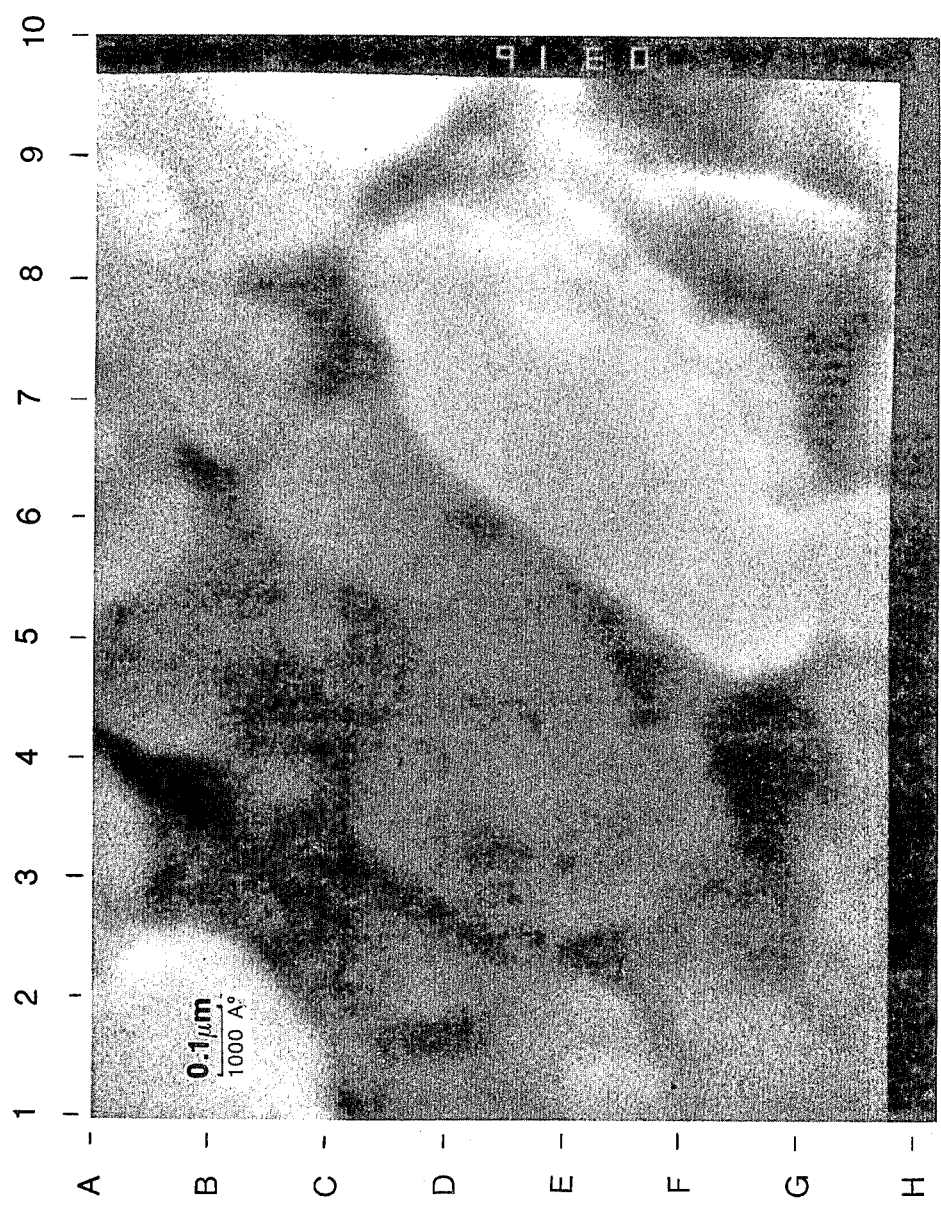
FIG. 13 is a SEM micrograph showing a catalyst matrix made according to the invention.

FIG. 13 is a photograph showing a catalyst matrix from which the carbon black has been removed, the catalyst composition having been made and fired in accordance with the teaching of the invention. The photograph has been marked with horizontal coordinates 1 through 10 and vertical coordinates A–H. The dark areas of the photograph are pores and the horizontal and vertical coordinates may be used to identify the location of those pores. The location and approximate size of the minor transverse dimension of some of the carbon black pores are identified as follows: D1-2, 300 Å; G4, 1500 Å; B6-7, 250 Å; C7-8, 700 Å; D9, 600 Å. As shown in the upper left hand corner of FIG. 13, the scale of this photograph is in micrometers (microns), one-tenth of a micrometer being equal to 1,000 Angstrom units. The dimensional units of FIG. 13 are comparable to those of FIGS. 9 through 12 where the scale is in nanometers (nm), one nanometer being equal to ten Angstrom units.

The Conversion Apparatus

Although the above catalyst may be used in various types of contacting operations within the contemplation of this invention, the catalyst is particularly useful in the catalytic cracking of residuum or carbo-metallic oil feeds. The catalytic cracking operation may be conducted in various types of reactors and associated equipment, such as fixed bed systems or fluidized systems. The catalyst is particularly useful in a fluidized bed type of operation where the catalyst in a finely divided fluidized state is suspended in vaporized feedstock and the suspension of catalyst and feedstock is passed upward through an elongated riser in a progressive flow arrangement without significant backmixing. In general, riser operations are carried out at conditions conducive to achieving the improved results desired, bearing in mind the specific feedstock, catalyst composition and process equipment being used. The process is preferably carried out without added hydrogen.

Figure 7:
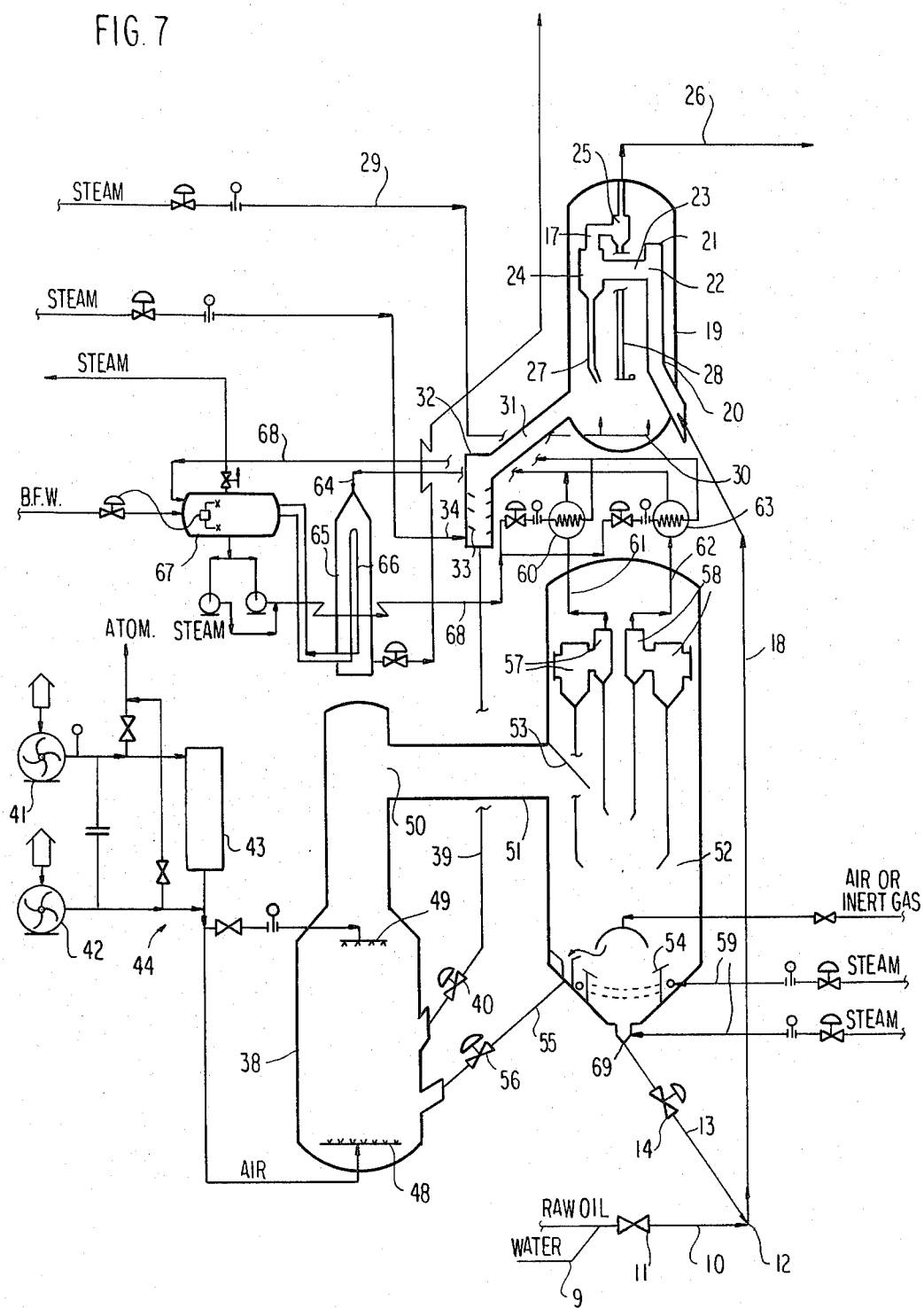
FIG. 7 is a schematic diagram of an apparatus for utilizing the catalyst and carrying out the process of the invention.

FIG. 7 is a schematic diagram of one apparatus for carrying out the process of the present invention. The carbon-metallic oil feed is supplied through a feed supply pipe 10 having a control valve 11 to a wye 12 in which the feed is mixed with a flow of catalyst delivered through a catalyst supply pipe 13 as controlled by a valve 14. When used, water or some other diluent may be introduced to the wye through a diluent supply pipe 9. The mixture of catalyst and feed, with or without additional diluent materials, then flows upward through a riser reactor 18. The riser 19 is an elongated conduit in which the length to diameter ratio may vary widely. The relatively narrow riser conduit provides high linear velocities, such as in the range of 25 to 90 feet per second. The length to diameter ratio of the riser is preferably in the range of 10 to 30, more preferably 20 to 25.

At the upper end of riser 18 is a chamber 19 which receives catalyst from the riser. While chamber 19 may be a conventional disengagement and collection chamber, often referred to as a reactor vessel, it is preferred that means be provided at the riser exit for causing product vapors to undergo a rapid change of direction relative to the direction traveled by the catalyst particles so that the vapors are suddenly or "ballistically" separated from the catalyst particles. Within disengagement chamber 19 of FIG. 7 is an upward extension 20 of riser pipe 18 having an open top 21 through which the catalyst particles are discharged. The product vapors are caused to undergo a sudden change of direction into lateral port 22 in the side of riser extension 20, the catalyst particles because of their momentum being, for the most part, unable to follow the product vapors into port 22. This embodiment of the cracking apparatus makes use of the vented riser concept described in U.S. Pat. Nos. 4,066,533 and 4,070,159 to Myers, et al., which patents are incorporated herein by reference. The vented riser thus provides a substantially instantaneous separation between hydrocarbon and catalyst in disengaging vessel 19. Because of the relatively high severity required to crack the more refractory components of carbo-metallic feeds, rapid disengagement of catalyst from cracked hydrocarbons by ballistic separation prevents overcracking of desirable liquid products, such as gasoline, to light undesirable products, such as hydrogen and methane gases and carbon.

The product vapors and a relatively small amount of catalyst entrained with them are transferred by a cross pipe 23 to a cyclone separator 24 for removing the entrained catalyst. The cyclone separator 24 may be connected via a transfer pipe 17 to an optional secondary cyclone separator 25. Product vapors are discharged from disengagement chamber 19 through overhead product discharge pipe 26.

The catalyst particles which discharge from open top 21 of riser pipe extension 20, and those entrained catalyst particles which are discharged from dip legs 27 and 28 of the primary and secondary cyclones 24 and 25, respectively, drop to the bottom of disengagement chamber 19. Catalyst spilling over from the bottom of disengagement chamber 19 passes via a drop leg 31 into a stripping chamber 32 equipped with baffles 33 and a steam jet 34. Other stripping gases known in the art may be introduced through jet 34 and employed with or in place of steam.

Accumulated carbon is burned from the catalyst in a combuster 38 which receives stripped catalyst via a downcomer pipe 39 with a control valve 40. Combustion air is supplied from an air supply system, generally indicated by 44 and including blowers 41 and 42 and filter bank 43, to combustion air jets 48 at the bottom of the combuster and to fluffing air jets 49 at an elevated position therein. Regenerated catalyst, with most of the carbon burned off, departs the combuster 38 through an upper outlet 50 and cross pipe 51 to a secondary combustion chamber 52, where it is deflected into the lower portion of chamber 52 by baffle 53. Although the use of two-stage regeneration is contemplated and preferred, in this particular embodiment, the secondary chamber 52 is operated primarily as a separator chamber for separating regenerated catalyst from combustion gases. Additional oxygen containing gas may be introduced through lines 59 and secondary chamber 52 operated with an excess of oxygen to insure removal of carbon deposits down to residual carbon levels of 0.05 weight percent or less.

Catalyst may optionally move in up to three different directions from secondary chamber 52. Fully regenerated catalyst is discharged through bottom outlet 69 to catalyst supply pipe 13 through which it is recirculated to wye 12 for contact with fresh feed as previously described. A portion of the hot catalyst may be circulated back to combuster 38 via catalyst recirculation line 55 with control valve 56 for heat control in the combuster and to raise the temperature of incoming air with hot catalyst so as to insure that combustion of coked catalyst is properly initiated. Since some of the catalyst will be entrained in the combustion gases, such as carbon oxides produced by burning of the carbon, two sets of primary and secondary cyclones, generally indicated by 57 and 58, are provided in chamber 52 for separating these catalyst fines from the combustion gases. Catalyst collected in cyclones 57, 58 is discharged through their dip legs to the bottom of chamber 52 where the catalyst is kept in suspension by air, inert gas and/or steam from lines 59 and by a baffle arrangement 54. Combustion product gases produced by regeneration of the catalyst and separated from entrained catalyst fines are discharged through effluent pipes 61, 62 and heat exchangers 60, 63. If such gases contain sufficient amounts of carbon monoxide, they may be sent via gas supply pipe 64 to an optional CO boiler in which the CO is burned in order to heat heating coil 66 connected with a steam boiler 67.

The amount of heat passed from the regenerator back to the riser is preferably controlled, at least in part, by controlling the flow of catalyst through catalyst standpipe 13 by control valve 14 which is preferably a type of slide valve operated by suitable automatic control equipment (not shown) responsive to the temperature of product vapors downstream of riser outlet 22. If additional heat removal from the combustion chambers is required, conventional direct or indirect cooling techniques may be employed in the manner known to persons skilled in the art of designing and operating regenerators.

Since the preferred conversion reactor is of the progressive flow type and is operated so that no dense bed of catalyst builds up within the riser, space velocities in the riser are usually high and will generally fall within the range of about 100 to 600 weight of hydrocarbon per hour per instantaneous weight of catalyst occupying the riser volume. In the absence of significant catalyst build up, the instantaneous catalyst inventory within the riser volume is represented by the catalyst particles suspended with the oil feed.

A particularly preferred embodiment is described in FIG. 15 where reference numeral 80 identifies a feed control valve in feedstock supply pipe 82. Supply pipe 83 (when used) introduces liquid water into the feed. Heat exchanger 81 in supply pipe 82 acts as a feed preheater, whereby preheated feed material may be delivered to the bottom of riser type reactor 91. Catalyst is delivered to the reactor through catalyst standpipe 86, the flow of catalyst being regulated by a control valve 87 and suitable automatic control equipment (not shown) with which persons skilled in the art of designing and operating riser type cracking units are familiar.

The reactor is equipped with a disengagement chamber 92 similar to the disengagement chamber 19 of the reactor shown in FIG. 7. Catalyst departs disengagement chamber 92 through stripper 94. Spent catalyst passes from stripper 94 to regenerator 101 via spent catalyst transfer pipe 97 having a slide valve 98 for controlling flow.

Regenerator 101 is divided into upper chamber 102 and lower chamber 103 by a divider panel 104 intermediate the upper and lower ends of the regenerator. The spent catalyst from transfer pipe 97 enters upper chamber 102 in which the catalyst is partially regenerated. A funnel-like collector 106 having a bias-cut upper edge receive partially regenerated catalyst from the upper surface of the dense phase of catalyst in upper chamber 102 and delivers it via drop leg 107 having an outlet 110 beneath the upper surface of the dense phase of catalyst in lower chamber 103. Instead of internal catalyst drop let 107, one may use an external drop leg. Valve means in such external drop let can control the residence time and flow rate in and between the upper and lower chambers.

Air is supplied to the regenerator through an air supply pipe 113. A portion of the air travels through a branch supply pipe 114 to bayonet 115 extending upwardly in the interior of plenum 111 along its central axis. Catalyst in chamber 103 has access to the space within plenum 111 between its walls and bayonet 115. A small bayonet (not shown) in the aforementioned space fluffs the catalyst and urges it upwardly toward a horizontally arranged ring distributor (not shown) where the open top of plenum 111 opens into chamber 103. The remainder of the air passing through air supply pipe 113 may be heated in air heater 117 (at least during start-up with VGO) and is then introduced into inlet 118 of the ring distributor, which may be provided with holes, nozzles or other apertures which produce an upward flow of gas to fluidize the partially regenerated catalyst in chamber 103.

The air in chamber 103 completes the regeneration of the partially regenerated catalyst received via drop let 107. The amount of air supplied is sufficient so that the resultant combustion gases are still able to support combustion upon reaching top of chamber 103. Drop leg 107 extends through an enlarged aperture in panel 104, to which is secured a gas distributor 120 which is concentric with and surrounds the drop leg. Combustion supporting gases, which have been partially depleted, are introduced via gas distributor 120 into upper regenerator chamber 102 where they contact incoming coked catalyst from coked catalyst transfer pipe 97. Apertured probes 121 in gas distributor 120 assist in achieving a uniform distribution of the partially depleted combustion supporting gas into upper chamber 102. Supplemental air or cooling fluids may be introduced into upper chamber 102 through a supply pipe 122, which may discharge through gas distributor 120.

Fully regenerated catalyst with less than about 0.25% carbon, preferably less than about 0.1% and more preferably less than about 0.05%, is discharged from lower regenerator chamber 103 through regenerated catalyst stripper 128, whose outlet feeds into catalyst standpipe 86. Thus, regenerated catalyst is returned to riser 91 for contact with additional fresh feed.

The division of the regenerator into upper and lower regeneration chambers 102 and 103 not only smooths out variations in catalyst regenerator residence time but is also uniquely of assistance in restricting the quantity of regeneration heat which is imparted to the fresh feed while yielding a regenerated catalyst with low levels of coke and/or carbon black for return to the riser.

Because of the arrangement of the regenerator, coked catalyst from transfer line 97 and/or virgin carbon black catalyst from addition line 99, with a high loading of carbon, contacts in chamber 102 combustion supporting gases which have already been at least partially depleted of oxygen by the burning of carbon from partially regenerated catalyst in lower chamber 102. Because of this, it is possible to control both the combustion of carbon and the quantity of carbon dioxide produced in upper regenerator chamber 102. Although regenerating gas introduced through air supply pipe 113 and branch conduit 114 may contain relatively large quantities of oxygen, the partially regenerated catalyst which it contacts in lower chamber 103 has already had a major portion of its carbon removed. The high oxygen concentration and temperature in chamber 103 combine to rapidly remove the remaining carbon in the catalyst, thereby achieving a clean, regenerated catalyst with a minimum of heat release. Thus, here again, the combustion temperature and CO to $CO_2$ ratio in the lower chamber are readily controlled. The regeneration off gases are discharged from upper chamber 102 via gas pipe 123, regulator valve 124, catalyst fines trap 125 and outlet 126.

The vapor products from disengagement chamber 92 may be processed in any convenient manner such as by discharge through vapor line 131 to fractionator 132. Fractionator 132 includes a bottoms outlet 133, side outlet 134, flush oil stripper 135, and stripper bottom line 136 connected to pump 137 for discharging flush oil. Overhead product from stripper 135 returns to fractionator 132 via line 138.

The main overhead discharge line 139 of the fractionator is connected to receiver 142 having a bottoms line 143 feeding into pump 144 for discharging gasoline product. A portion of this product may be returned to the fractionator via recirculation line 145, the flow being controlled by valve 146. The receiver also includes a water receiver 147 and a water discharge line 148. The gas outlet 150 of the overhead receiver discharges a stream which is mainly below $C_5$, but containing some $C_5$, $C_6$ and $C_7$ material. If desired, the $C_5$ and above material in the gas stream may be separated by compression, cooling and fractionation, and recycled to receiver 142.

The oxidizing gas, such as air, introduced into regeneration zone 103 through line 114 may be mixed with a cooling spray of water from a conduit 109. The mixture of oxidizing gas and atomized water flows through bayonet 115 and thus into the lower bed of catalyst particles.

The apertures in distributor 120 are large enough so that the upwardly flowing gas readily passes therethrough into zone 102. However, the perforations are sized so that the pressure difference between the upper and lower zones prevents catalyst particles from passing downwardly through the distributor. The bayonet 115 and distributor are similarly sized. Gases exiting the regenerator comprise combustion products, nitrogen, steam formed by combustion reactions and/or from vaporizing water added with the oxidizing gas, and oxides of sulfur and other trace elements. These gases are separated from suspended catalyst particles by a cyclone separator (not shown) and then pass out of the regenerator through discharge conduit 123.

Figure 8:
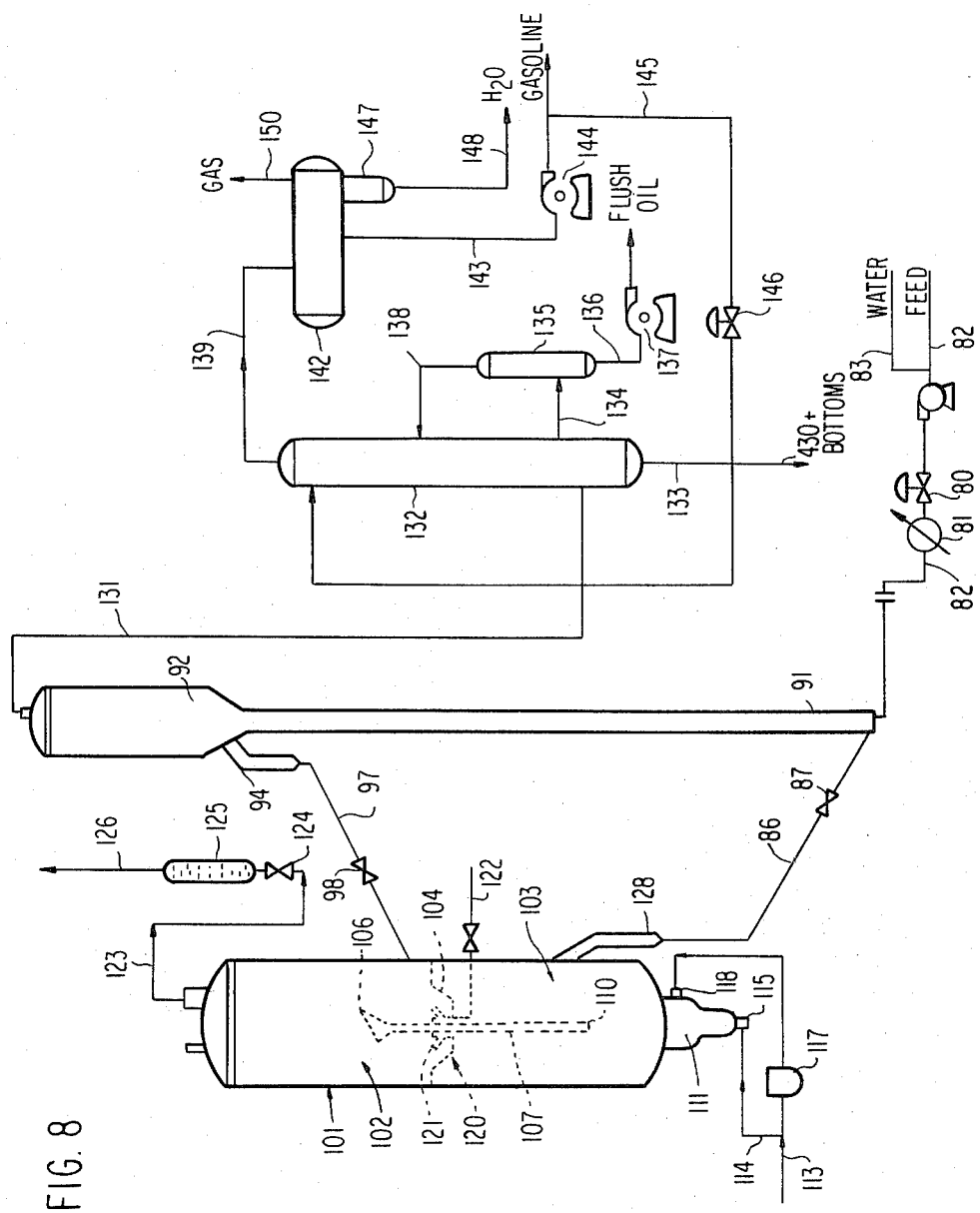
FIG. 8 is a schematic diagram of another apparatus for utilizing the catalyst and carrying out the process of the invention.
Figure 9A:
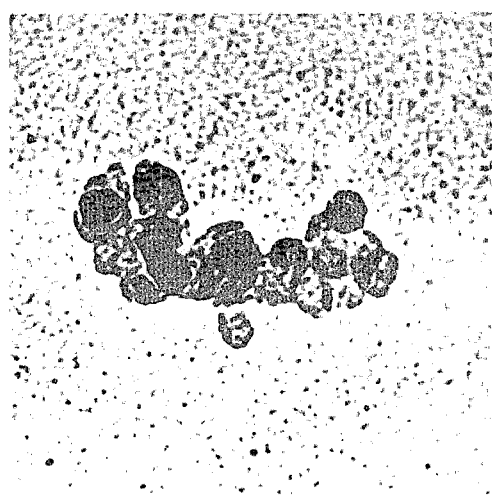
Figure 9B:
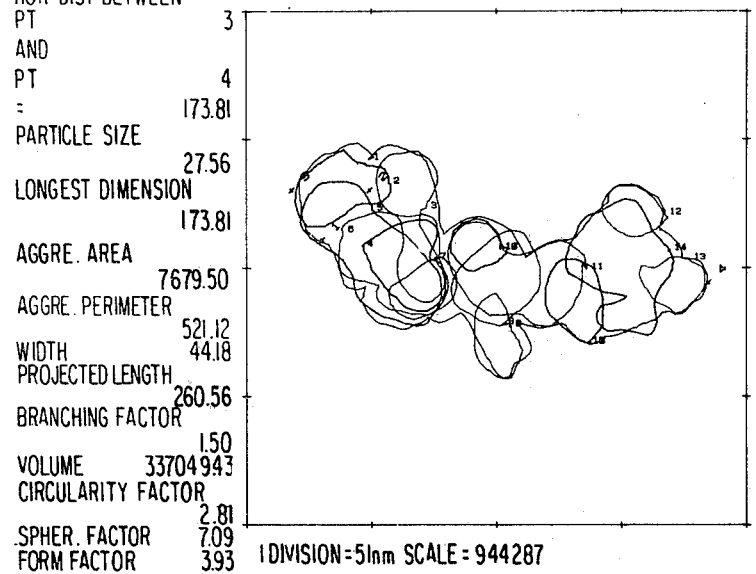
Figure 10A:
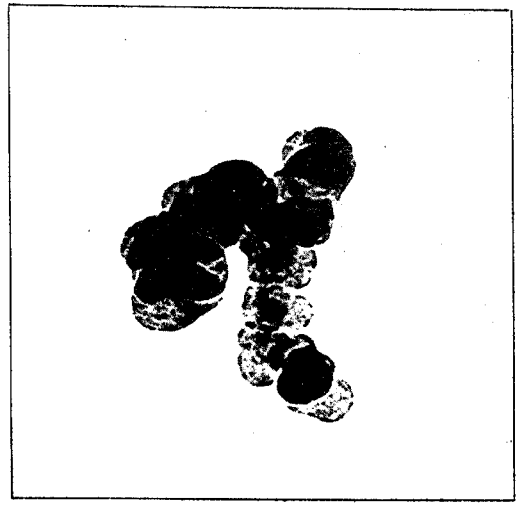
Figure 10B:
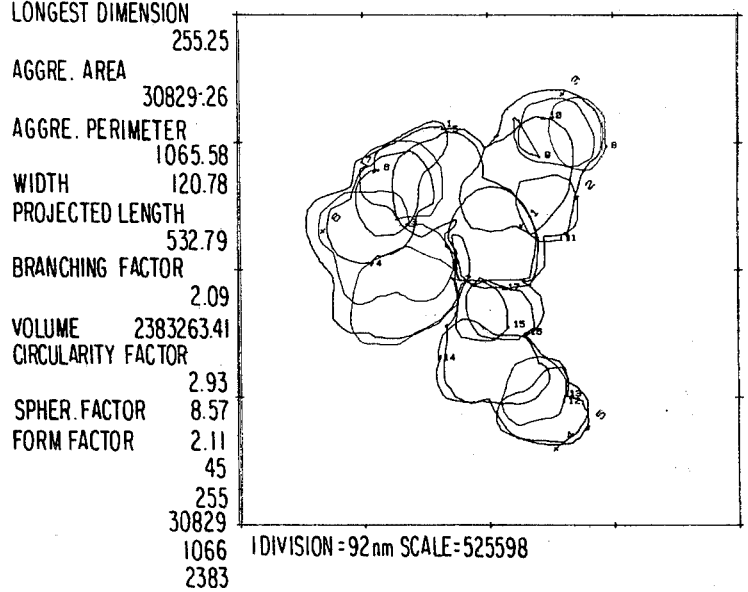
Figure 12A:
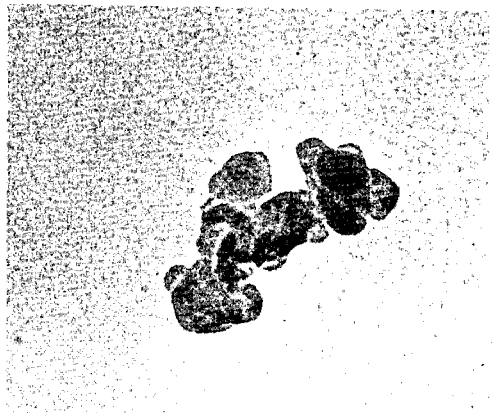
Figure 12B:
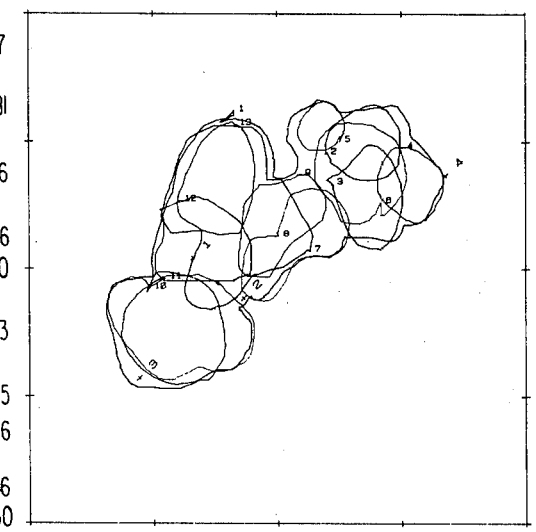

While this invention may be used with single stage regenerators, or with the multiple stage regenerator of FIG. 7, which has basically concurrent instead of countercurrent flow, it is especially useful in a regenerator of the type shown in FIG. 8, which is well-suited for producing combustion product gases having a high ratio of CO to $CO_2$, which helps lower regeneration temperatures in the presence of high carbon levels.

The Conversion Process

The catalysts described in this specification may be employed in the processes and apparatuses for carbometallic oil conversion described in co-pending U.S. applications Ser. Nos. 94,091; 94,092; 94,216; 94,217; and 94,277 of Ashland Oil, Inc., each of said co-pending applications having been filed on Nov. 14, 1979, and being expressly incorporated herein by reference.

Furthermore, the adverse effects of vanadium deposited on the catalyst may be controlled as described in co-pending international application No. PCT/US81/00356 of Ashland Oil, Inc., filed on Mar. 19, 1981, and entitled IMMOBILIZATION OF VANADIA DEPOSITED ON CATALYTIC MATERIALS DURING CARBO-METALLIC OIL CONVERSION, which application is incorporated herein by reference.

A preferred method for cracking feeds with heavy fractions, referred to as Reduced Crude Conversion (RCC) after a particularly common and useful carbometallic feed, is disclosed in co-pending application Ser. No. 94,216 filed on Nov. 14, 1979, for "Carbo-Metallic Oil Conversion", which application is incorporated herein by reference. The preferred feeds capable of being cracked by this method are comprised of 100 percent or less of the 650° F.+ material previously described. The cracking reaction according to the method disclosed in Ser. No. 94,216 is sufficiently severe to convert 50 to 90 percent of the carbo-metallic oil feed to gasoline per pass and produce coke in amounts of 4 to 14 percent by weight based on weight of fresh feed. This coke is laid down on the catalyst in amounts in the range of about 0.3 to 3 percent by weight of catalyst, depending upon the catalyst to oil ratio (weight of catalyst to weight of feedstock) in the riser.

The feed, with or without pretreatment, is introduced as shown in FIG. 7 into the bottom of the riser along with a suspension of hot cracking catalyst prepared in accordance with this invention. Steam, naphtha, water and/or some other diluent is preferably introduced into the riser along with the feed. These additives may be from a fresh source or may be recycled from a process stream in the refinery. Where recycle additive streams are used, they may contain hydrogen sulfide and other sulfur compounds which may help passivate adverse catalytic activity by heavy metals accumulating on the catalyst. It is to be understood that the water additive may be introduced either as a liquid or as steam. Water is added primarily as a source of vapor for accelerating the feed and catalyst to achieve the vapor velocity and residence times desired. Other diluents as such need not be added but where used, the total amount of diluent specified includes the amount of water used. Extra diluent would further increase the vapor velocity and further lower the feed partial pressure in the riser.

As the feed travels up the riser, it is catalytically cracked to form basically five products known in the industry as dry gas, wet gas, cat naphtha, light cycle oil, and heavy cycle and/or slurry oil. At the upper end of the riser, the catalyst particles are ballistically separated from product vapors as previously described. The catalyst which then contains the coke formed in the riser is sent to the regenerator to burn off the coke and the separated product vapors are sent to a fractionator for further separation and treatment to provide the five basic products indicated. The preferred process conditions for the riser conversion reaction are set forth in Table 3, in which the abbreviations used have the following meanings: "Temp." for temperature, "Dil." for diluent, "pp" for partial pressure, "wgt" for weight, "V" for vapor, "Res." for residence, "C/O" for catalyst to oil ratio, "Cat." for catalyst, "bbl" for barrel, "MAT" for microactivity by the MAT test using a standard Davison feedstock, "Vel." for velocity, "cge" for charge, "d" for density, and "Reg." for regenerated.

TABLE 6

| RCC RISER CONDITIONS | | |
|---|---|---|
| Parameter | Board Operating Range | Preferred Range |
| Feed Temp. | 400–800° F. | 400–650° F. |
| Stream Temp. | 200–500° F. | 300–400° F. |
| Reg. Catalyst Temp. | 1100–1500° F. | 1275–1450° F. |
| Riser Exit Temp. | 900–1400° F. | 950–1100° F. |
| Pressure | 0–100 psia | 10–50 psia |
| Water/Feed | 0.05–0.30 | 0.05–0.15 |
| Dil. pp/Feed pp | 0.25–3.0 | 1.0–2.5 |
| Dil. wgt/Feed wgt | $\leq 0.4$ | 0.1–0.3 |
| V. Res. Time | 0.1–5 | 0.5–3 sec. |
| C/O, wgt. | 3–18 | 5–12 |
| Lbs. Cat./bbl Feed | 0.1–4.0 | 0.2–2.0 |
| Inlet Cat. MAT | >50 vol. % | $\geq 60$ |
| Outlet Cat. MAT | $\geq 20$ vol. % | $\geq 40$ |
| V. Vel. | 25–90 ft./sec. | 30–60 |
| V. Vel./Cat. Vel. | $\geq 1.0$ | 1.2–2.0 |
| Dil. Cge. Vel. | 5–90 ft./sec. | 10–50 |
| Oil Cge. Vel. | 1–50 ft./sec. | 5–50 |
| Inlet cat. d. | 1–9 lbs./ft$^3$ | 2–6 |
| Outlet cat. d. | 1–6 lbs./ft$^3$ | 1–3 |
| Coke, wgt. % coked cat. | 0.6–1.5 | 0.8–1.3 |

In cracking carbo-metallic feedstocks in accordance with the method of Ser. No. 94,216, the regenerating gas may be any gas which can provide oxygen to convert carbon to carbon oxides. Air is highly suitable for this purpose in view of its ready availability. The amount of air required per pound of coke for combustion depends upon the desired carbon dioxide to carbon monoxide ratio in the effluent gases and upon the amount of other combustible materials present in the coke, such as hydrogen, sulfur, nitrogen and other elements capable of forming gaseous oxides at regenerator conditions.

The regenerator is operated at temperatures in the range of about 1,000° to 1,600° F., preferably 1,275° to 1,450° F., to achieve adequate combustion while keeping catalyst temperatures below those at which significant catalyst degradation can occur. In order to control these temperatures, it is necessary to control the rate of burning which in turn can be controlled at least in part by the relative amounts of oxidizing gas and carbon introduced into the regeneration zone per unit time. The rate of introducing carbon into the regenerator may be controlled by regulating the rate of flow of coked catalyst through valve 40 in conduit 39, the rate of removal of regenerated catalyst by regulating valve 14 in conduit 13, and the rate of introducing oxidizing gas by the speed of operation of blowers 41, 42. These parameters are regulated such that the ratio of carbon dioxide to carbon monoxide in the effluent gases is equal to or less than about 4.0, preferably 1.5 or less. In addition, water, either as liquid or steam, may be added to the regenerator to help control temperatures and to influence the carbon dioxide to carbon monoxide ratio.

The regenerator combustion reaction is carried out so that the amount of carbon remaining on regenerated catalyst is less than about 0.25, preferably less than about 0.05 percent and most preferably less than about 0.01 percent on a substantially moisture-free weight basis. The residual carbon level is ascertained by conventional techniques which include drying the catalyst at 1,100° F. for about four hours before measuring carbon content.

In the method of regeneration of the present invention, the amount of oxidizing gas and catalyst are controlled so that the amount of oxidizing gas passing into the second zone is greater than that required to convert all of the coke remaining on the catalyst reaching this oxygen rich zone to carbon dioxide. On the other hand, the amount of oxidizing gas passing into the first zone from the second zone and the additional oxidizing gas added to the first zone, such as through line 116 and distributor 118 in FIG. 8, is insufficient to convert all of the coke in this zone to carbon dioxide. As the first zone is therefore oxygen deficient, significant afterburning and excessive temperatures in the first zone are prevented, thereby protecting both the catalyst and regeneration equipment from damage.

INDUSTRIAL APPLICABILITY

The present invention is particularly useful in the catalytic cracking of high boiling carbo-metallic feedstocks to lower boiling hydrocarbon fractions in the liquid fuel range. Examples of these oils are reduced crudes and other crude oils or crude oil fractions containing residua as hereinabove defined. However, it is to be understood that the catalyst and processes of the present invention are useful for cracking almost any crude oil or crude oil fraction, including conventional light and heavy gas oils.

Although the process is preferably conducted in a riser reactor of the vented type, other types of risers with either upward or downward flow or non-riser type reactors may be employed. Thus, the cracking operation may be conducted with a fluid bed of catalyst through which the feedstock is passed under suitable contact conditions of pressure, temperature and feed rate. Alternately, the catalyst may be used in the form of a moving bed passing through or otherwise contacted with the feedstock materials to be cracked.

Although the preferred contacting operation is catalytic cracking, the catalyst and processes of the invention may be employed in various other types of hydrocarbon conversion operations, such as dehydrocyclization, hydrocracking, hydroforming of naphthene hydrocarbons and the like, polymerization of olefins, depolymerization of polymers, alkylation, dealkylation, disproportionation, reforming of naphthas, isomerization of paraffins and the like, aromatization of paraffins and the like, hydrogenation, dehydrogenation, various types of hydrofining operations in which one or more characteristics of the feedstock are improved by treatment with hydrogen in the presence of a catalyst, oxidation of organic compounds with an oxidation media such as air, adsorption and absorption operations, and like types of other contacting, conversion and/or separation processes.

With the present invention, greater cracking selectivity to gasoline boiling range products and less carbon make for a given level of conversion may be achieved because of the greater accessibility of reaction sites to reactants and reduction in undesirable side reactions. Also the processes may be operated at higher space velocities and/or lower reaction temperatures to achieve a given selectivity, conversion and octane number as compared to conventional processes employing conventional catalysts. The catalyst is generally easier to regenerate than prior art catalyst whether by conventional regeneration processes or those of the invention because diffusion limitations on oxidation reactions within the catalyst are minimized.

The large pore CB catalyst has high tolerances to both metals and coke and are therefore highly suitable for cracking any charge stock containing metal contaminates and/or coke precursors. By "high tolerance" is meant that the catalyst can accumulate significantly greater quantities of poison metals and coke as compared to prior art catalysts and still have effective catalytic activity in the processes of the invention. During the conversion reaction, metals and coke may deposit on the walls of the large feeder pores, rather than on the zeolite where they can block substantial numbers of catalytic sites. The large feeder pore matrix thereby prolongs the useful life of the zeolite promoter. The large feeder pores are also capable of absorbing asphaltenes and other liquid hydrocarbons boiling above reactor temperatures without becoming filled to a degree significantly retarding diffusion of lower boiling reactant molecules.

Because the large feeder pores provide better diffusion of large molecules they may be cracked at acidic sites instead of thermally at or near the catalyst surface. There is therefore less coke laydown for a given level of conversion. Diffusion during regeneration is also improved so that temperatures of localized hot spots will be considerably less and correspondingly there is less matrix and zeolite pore collapse due to sintering. Furthermore, with larger pore diameters, partial collapse of feeder pores restrict hydrocarbon diffusion to a lesser degree than with conventional catalysts. The large feeder pores are also less likely to be blocked by the disposition of heavy metals and coke on particle surfaces.

One factor reducing the quantities of coke to be removed in the regenerator is the relative ease with which both uncracked and cracked hydrocarbons can be stripped from the large feeder pores. Another factor reducing coke deposits is that asphaltenes and other hydrocarbons remaining in a liquid state are more likely to be cracked by reaching an acid site either in the matrix material or on an exposed surface of the zeolite.

A further industrial advantage of the invention is the ease with which a gel slurry of the catalyst composite can be spray dried and formed into attrition resistent microspheres of a controlled, fluidizable size. After formation, these microspheres may be easily washed and redried and then fired to remove the carbon black without significant alteration of either the zeolite or the support structure of the matrix. An especially important feature of the invention is that the carbon black can be removed during initial circulation of the catalyst through the reactor and regenerator of an operating conversion unit, rather than requiring removal during catalyst manufacture.

What is claimed is:

1. A process for preparing a hydrocarbon conversion catalyst characterized by an increased percentage of feeder pores in the size range of about 100 to 6,000 Å, which process comprises admixing carbon black composed of primary reticulated particles having a size of about 400 to 30,000 Å, a carbon black dispersant and a shapeable catalyst composition having hydrocarbon conversion characteristics;

during said admixing controlling the agglomeration of the primary reticulated carbon black particles by the amount and dispersing effectiveness of said dispersant, to provide increased percentages of feeder pores in the range of about 100 to 6,000 Å;

shaping said catalyst composition into solid shapes of hydrocarbon conversion catalyst containing 1 to 35 weight percent of said carbon black and heating said solid catalyst shapes in the presence of an oxygen-containing gas at combustion conditions sufficient to remove said carbon black particles and provide large feeder pores of 100 to 6,000 Å in said solid catalyst shapes.

2. The process of claim 1 in which a promoter containing catalytic sites for hydrocarbon conversion is provided in said solid catalyst shapes and said shapable catalyst composition includes a matrix material for supporting said promoter in said solid catalyst shapes.

3. The process of claim 2 in which said promoter is a natural or synthetic zeolite.

4. The process of claim 1 in which said shapable catalyst composition includes silica and alumina materials capable of forming crystalline aluminosilicates, and in which said aluminosilicates are crystallized after at least a portion of said carbon black particles are mixed with said silica alumina materials.

5. The process of claim 1 in which the effective diameter of at least a portion of said feeder pores provided by removal of said carbon black particles is in the range of 100 to 6,000, or 400 to 6,000 or Angstroms.

6. The process of claim 1 in which the pore volume provided by removal of said carbon black particles is at least 0.1 cc/gm.

7. The process of claim 1 in which said solid catalyst shapes after said heating contain cation exchanged zeolite in an amount in the range of about 5 to 45 weight percent.

8. The process of claim 1 in which said shaped catalyst composition contains carbon black in the range of 5 to 25 weight percent prior to said heating step.

9. The process of claim 1 in which said shaped catalyst composition contains carbon black in the range of 10 to 20 or 15 to 18 weight percent prior to said heating step.

10. The hydrocarbon conversion catalyst prepared according to the process of claim 1.

11. A cracking catalyst comprising a cation exchanged zeolite in an amount in the range of about 10 to 40 weight percent, and a silica, alumina or silica-alumina matrix in an amount in the range of about 15 to 90 weight percent, said catalyst having a pore volume of at least 0.10 cc per gm formed by the process of claim 1.

12. The process of claim 1 wherein said shapeable catalyst composition includes an aqueous slurry of a hydrogel suitable for forming a solid catalyst matrix.

13. The process of claim 12 in which said aqueous slurry contains a siliceous gel or a colloidal dispersion of silica gel.

14. The process of claim 12 in which said aqueous slurry contains an alumina gel.

15. The process of claim 12 in which said aqueous slurry contains a silica gel or alumina gel or both a silica gel and a alumina gel.

16. The hydrocarbon conversion catalyst prepared according to the process of claim 12.

17. The catalyst of claim 16 prepared from a catalyst composition which further contains a cation exchanged Y or X or Y-X zeolite in an amount in the range of about 3 to 45 weight percent, said composition being further exchanged with rare earth ions following said combustion of carbon black particles to provide a zeolite catalyst of improved hydrothermal stability.

18. The process of claim 12 in which a crystalline aluminosilicate zeolite is added to said mixture prior to processing said mixture to form said solid catalyst shapes.

19. The process of claim 18 wherein said zeolite is a Type Y or Type X zeolite.

20. The process of claim 19 wherein said zeolite is exchanged with hydrogen, ammonium or rare earth ions or a mixture of said ions.

21. The process of claim 12 in which said hydrogel slurry further contains sufficient clay to give a solid combusted catalyst with up to 75 percent clay by weight.

22. A catalyst prepared according to the process of claim 1 wherein said carbon black meets the specifications of ASTM No. N-219.

23. A process of claim 1 wherein said carbon black is dispersed in the catalyst forming media during the preparation of said catalyst.

24. The process according to claim 23 wherein said dispersant medium is selected from the group consisting of hexadecyltrimethylammonium bromide, sodium lignosulfonate, and mixtures thereof.

25. The process according to claim 1 wherein the ratio of average feed pore diameter to average hydrocarbon diameter is in the range of 2 to 10.

26. The process according to claim 1 wherein the ratio of average feed pore diameter to average hydrocarbon diameter is in the range of 4 to 8.

27. The process according to claim 1 wherein the ratio of average feeder pore diameter to average hydrocarbon diameter is in the range of 5 to 8.

28. A process according to claim 2 wherein said catalyst is spray dried into microspheres, said microspheres have a spray dried matrix in the range of about 5 to about 160 microns.

29. The process according to claim 2 wherein said catalyst composition is spray dried to form catalyst microspheres and said catalyst microspheres can contain a spray dried matrix in the range of 40 to 80 microns.

30. A process according to claim 2 wherein said promoter is selected from the group consisting of Pb, Sn, Bi, Ge, Sc, Ti, Cr, Mn, Co, Zn, Y, Nb, Mo, Ma, Ru, Rh, Pd, La, Hf, Ta, W, Re, Os, Ra, Pt, Zr, Ac, Th, Pa, U, and mixtures thereof and said promoter is the concentration of within the range of 1 to about 5 weight percent of the fired catalyst.

* * * * *